US008144238B2

(12) United States Patent
Kotake et al.

(10) Patent No.: US 8,144,238 B2
(45) Date of Patent: Mar. 27, 2012

(54) IMAGE PROCESSING APPARATUS AND METHOD

(75) Inventors: Daisuke Kotake, Yokohama (JP); Toshihiro Nakazawa, Yokohama (JP); Masahiro Suzuki, Kawasaki (JP); Rika Takemoto, Kawasaki (JP); Kiyohide Satoh, Kawasaki (JP); Yoshihiko Iwase, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 335 days.

(21) Appl. No.: 11/836,077

(22) Filed: Aug. 8, 2007

(65) Prior Publication Data

US 2008/0284864 A1 Nov. 20, 2008

(30) Foreign Application Priority Data

Aug. 11, 2006 (JP) ................. 2006-219846

(51) Int. Cl.
*G03B 13/00* (2006.01)
*H04N 5/232* (2006.01)
*H04N 5/262* (2006.01)
*G06K 9/00* (2006.01)
*G06K 9/48* (2006.01)

(52) U.S. Cl. ......... 348/349; 348/239; 382/154; 382/199
(58) Field of Classification Search ............... 348/222.1; 382/103, 173, 286, 154, 199, 291
See application file for complete search history.

(56) References Cited

U.S. PATENT DOCUMENTS

| | | | | |
|---|---|---|---|---|
| 5,953,076 A * | 9/1999 | Astle et al. | .................. | 348/584 |
| 6,788,809 B1 * | 9/2004 | Grzeszczuk et al. | .......... | 382/154 |
| 6,822,643 B2 * | 11/2004 | Matsui et al. | .................. | 345/204 |
| 7,230,653 B1 * | 6/2007 | Overton et al. | ............... | 348/584 |
| 7,327,888 B2 * | 2/2008 | Simon et al. | .................. | 382/217 |
| 7,372,977 B2 * | 5/2008 | Fujimura et al. | .............. | 382/103 |
| 7,586,655 B1 * | 9/2009 | Uhlik et al. | .................... | 358/497 |
| 2002/0041327 A1 * | 4/2002 | Hildreth et al. | ................. | 348/42 |
| 2003/0185461 A1 | 10/2003 | Ohshima | | |
| 2004/0032906 A1 * | 2/2004 | Lillig | ....................... | 375/240.08 |
| 2005/0234333 A1 * | 10/2005 | Takemoto et al. | ............ | 600/426 |
| 2006/0098873 A1 * | 5/2006 | Hildreth et al. | ............... | 382/181 |

FOREIGN PATENT DOCUMENTS

| | | |
|---|---|---|
| JP | 2003-296759 A | 10/2003 |
| JP | 2005-267258 A | 9/2005 |
| JP | 2005-346469 A | 12/2005 |

OTHER PUBLICATIONS

Okuma et al., "Real-Time Camera Parameter Estimation from Images for an Augmented Reality", [insert name of Journal],Oct. 1999, pp. 1784-1792, vol. J82-D-II, No. 10.

(Continued)

*Primary Examiner* — Jason Chan
*Assistant Examiner* — Pritham Prabhakher
(74) *Attorney, Agent, or Firm* — Canon U.S.A., Inc. IP Division

(57) ABSTRACT

In position and orientation measurement based on natural features, erroneous detection of the natural features is prevented when an observation target object is occluded by another object, and registration stability is improved. To this end, an occluding object that can occlude the observation target object is defined, and an occluding region where the occluding object occludes the observation target object is detected in an input captured image. Image features of the observation target object are detected in a region of the captured image other than the detected occluding region. Therefore, the position or orientation of an image pickup apparatus that captured the captured image, or the position or orientation of the observation target object in the captured image are calculated.

15 Claims, 19 Drawing Sheets

OTHER PUBLICATIONS

Ito et al., "View-based Visual Tracking with Robustness against Occlusions", Journal of the Robotics Society of Japan, Nov. 2001, pp. 98-106, vol. 19, No. 8.

Hirokazu Kato, "ARToolKit: Library for Vision-based Augmented Reality", Institute of Electronics, Information and Communication Engineers, Feb. 2002, pp. 79-86, vol. 101, No. 652, Japan.

* cited by examiner

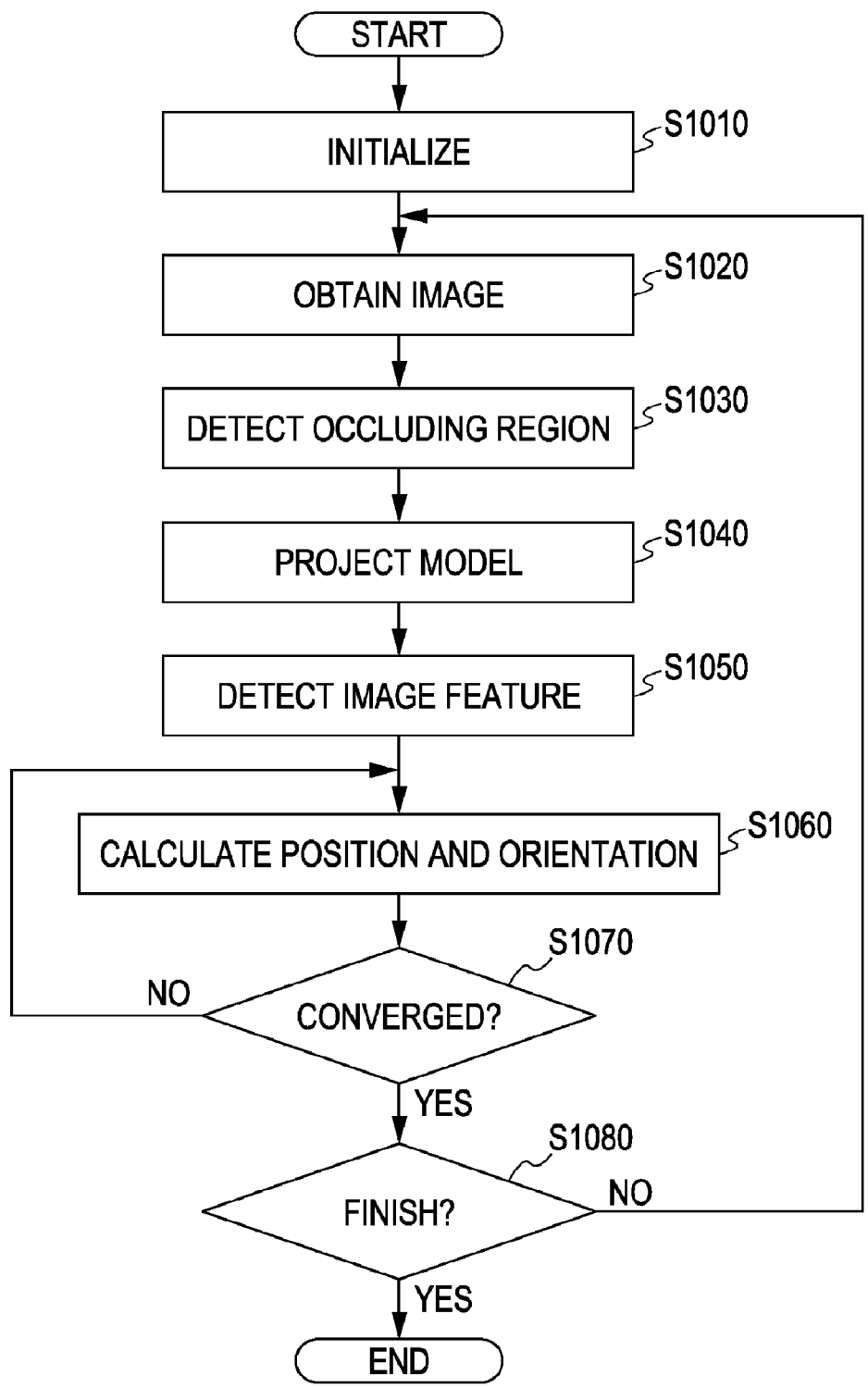

| POINT | X | Y | Z |
|---|---|---|---|
| P1 | 0 | 200 | 0 |
| P2 | 0 | 200 | 250 |
| P3 | 250 | 200 | 250 |
| P4 | 250 | 200 | 0 |
| P5 | 0 | 0 | 0 |
| P6 | 0 | 0 | 250 |
| P7 | 250 | 0 | 250 |
| P8 | 250 | 0 | 0 |

FIG. 4C

| SURFACE | POINTS DEFINING SURFACE AND ORDER |
|---|---|
| F1 | P1-P2-P3-P4 |
| F2 | P1-P4-P8-P5 |
| F3 | P1-P2-P6-P5 |
| F4 | P5-P6-P7-P8 |
| F5 | P2-P3-P7-P6 |
| F6 | P3-P4-P8-P7 |

FIG. 4D

| LINE | TWO END POINTS OF LINE |
|---|---|
| L1 | P1-P2 |
| L2 | P2-P3 |
| L3 | P3-P4 |
| L4 | P4-P1 |
| L5 | P5-P6 |
| L6 | P6-P7 |
| L7 | P7-P8 |
| L8 | P8-P5 |
| L9 | P1-P5 |
| L10 | P2-P6 |
| L11 | P3-P7 |
| L12 | P4-P8 |

● DIVISION POINT

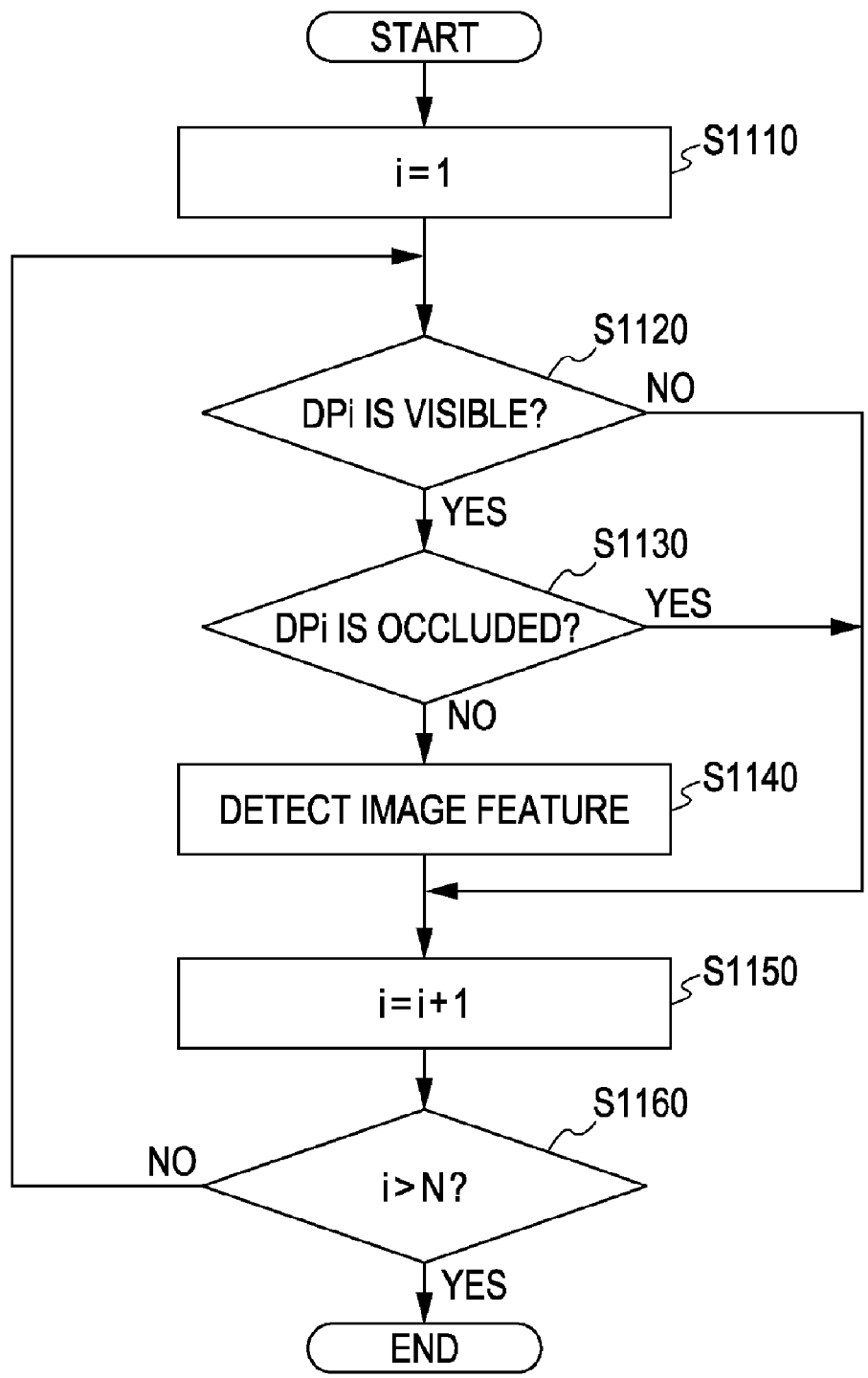

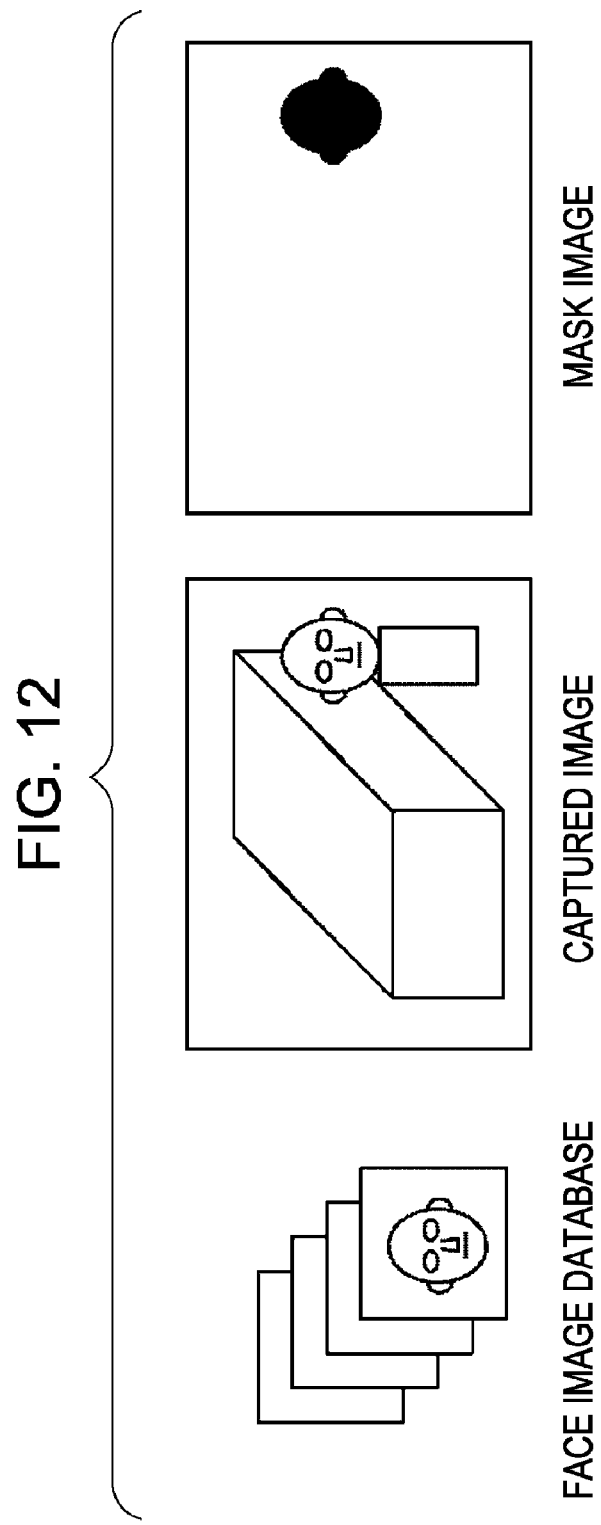

IMAGE PROCESSING APPARATUS AND METHOD

BACKGROUND OF THE INVENTION

1. Field of the Invention

The present invention relates to a technique for calculating at least one of the position and orientation of an image pickup apparatus or an observation target object on the basis of image features detected on a captured image.

2. Description of the Related Art

Recently, research of Mixed Reality (MR) techniques for providing a seamless integration of real and virtual spaces has been actively conducted. Among these MR techniques, especially an Augmented Reality (AR) technique that superimposes a virtual space on a real space has received attention.

An image providing apparatus employing the AR technique is mainly implemented by a video see-through or optical see-through head mounted display (HMD).

In a video see-through HMD, a virtual-space image (e.g., virtual objects or text information rendered by computer graphics) generated according to the position and orientation of an image pickup apparatus such as a video camera in the HMD is superimposed on a real-space image captured by the image pickup apparatus, and the resulting synthesized image is displayed to a user. In an optical see-through HMD, a virtual-space image generated according to the position and orientation of the HMD is displayed on a transmissive-type display to allow a synthesized image of real and virtual spaces to be formed on the retina of a user.

One of the most serious problems with the AR technique is accurate registration between real and virtual spaces, and many attempts have been made to address this problem. In a video see-through HMD, the problem of registration in AR involves accurate determination of the position and orientation of the image pickup apparatus in a scene (that is, in a reference coordinate system defined in the scene). In an optical see-through HMD, the problem of registration involves accurate determination of the position and orientation of the HMD in a scene.

To solve the former problem, it is common to place artificial markers in a scene and determine the position and orientation of the image pickup apparatus in the reference coordinate system using the markers. The position and orientation of the image pickup apparatus in the reference coordinate system are determined from the correspondences between detected positions of the markers in an image captured by the image pickup apparatus and known information, namely, three-dimensional positions of the markers in the reference coordinate system.

To solve the latter problem, it is common to attach an image pickup apparatus to the HMD and determine the position and orientation of the image pickup apparatus in a manner similar to that described above to determine the position and orientation of the HMD on the basis of the determined position and orientation of the image pickup apparatus.

Methods for determining the position and orientation of an image pickup apparatus on the basis of correspondences between image coordinates and three-dimensional coordinates have been proposed for a long time in the fields of photogrammetry and computer vision.

A method for determining the position and orientation of an image pickup apparatus by solving nonlinear simultaneous equations on the basis of correspondence of three points is disclosed in R. M. Haralick, C. Lee, K. Ottenberg, and M. Nolle, "Review and Analysis of Solutions of the Three Point Perspective Pose Estimation Problem", International Journal of Computer Vision, vol. 13, No. 3, PP. 331-356, 1994 (hereinafter referred to as "Document 1").

A method for determining the position and orientation of an image pickup apparatus by optimizing a rough position and orientation of the image pickup apparatus through iterative calculations on the basis of correspondences between image coordinates and three-dimensional coordinates of a plurality of points is disclosed in D. G. Lowe, "Fitting Parameterized Three-Dimensional Models to Images", IEEE Transactions Pattern Analysis and Machine Intelligence, vol. 13, No. 5, PP. 441-450, 1991 (hereinafter referred to as "Document 2").

Another serious problem in AR technology, other than registration, is an occlusion problem in which determination of the in-front/behind relationship between real and virtual spaces is required. For example, when a virtual object is located at a position hidden or occluded by a real object such as a hand, it is necessary to render the real object in front of the virtual object. If the occlusion effect is not taken into account, the virtual object is always rendered in front of the real object, and an observer viewing the resulting image feels unnatural. In Japanese Patent Laid-Open No. 2003-296759 (hereinafter referred to as "the Patent Document"), the occlusion problem is overcome by designating the color of an occluding real object (e.g., the color of a hand) in advance so that a virtual object is not rendered in a region of a captured image having the same color as the occluding real object.

In N. Yokoya, H. Takemura, T. Okuma, and M. Kanbara, "Stereo vision based video see-through mixed reality," in (Y. Ohta & H. Tamura, eds.) Mixed Reality-Merging Real and Virtual Worlds, Chapter 7, Ohmsha-Springer Verlag, 1999 (hereinafter referred to as "Document 11"), the occlusion problem is overcome by obtaining real-space depth information through stereo matching using images captured by two built-in cameras of an HMD.

With the recent high-speed performance of computing machines, research of registration using features present in a scene (hereinafter referred to as "natural features"), rather than artificial markers, has been actively carried out.

Methods for determining the position and orientation of an image pickup apparatus on the basis of correspondences between image edges and a three-dimensional model of an observation target are disclosed in T. Drummond and R. Cipolla, "Real-time visual tracking of complex structures", IEEE Transaction Pattern Analysis and Machine Intelligence, vol. 24, No. 7, PP. 932-946, 2002 (hereinafter referred to as "Document 3"), and A. I. Comport, E. Marchand, and F. Chaumette, "A real-time tracker for markerless augmented reality", Proceedings of the Second IEEE and ACM International Symposium on Mixed and Augmented Reality (IS-MAR03), PP. 36-45, 2003 (hereinafter referred to as "Document 4").

In these methods, first, (1) a three-dimensional model is projected onto a captured image using a rough position and rough orientation of an image pickup apparatus. The rough position and rough orientation of the image pickup apparatus are, for example, the position and orientation calculated in the preceding frame. Then, (2) line segments comprising the projected model are divided into equal intervals on the image, and, for each of the division points, a point (edge) where the intensity gradient is a local maximum in the direction perpendicular to the projected line segment is searched for as a corresponding point. Further, (3) correcting values of the position and orientation of the image pickup apparatus are determined so that the distances between the corresponding points found for the individual division points and the corresponding projected line segments become minimum on the image, and the position and orientation of the image pickup apparatus are updated. The three-dimensional model is again projected onto the captured image using the updated position and orientation of the image pickup apparatus, and the step (3) is iterated until the sum of the distances has converged to the optimum. Thus, the final position and orientation of the image pickup apparatus are obtained.

In the above step (2), erroneous detection may occur if the accuracy of the rough position and rough orientation of the image pickup apparatus is low. That is, wrong points may be detected as corresponding points. If such erroneous detection occurs, the iterative calculations may not be converged in the step (3), or the accuracy of the obtained position and orientation of the image pickup apparatus may be low, resulting in low-accuracy AR registration.

In Documents 3 and 4, therefore, an M-estimator, which is a robust estimation method, is used to minimize the sum of weighted errors by assigning a small weight to data having a large distance between the corresponding point and the line segment and assigning a large weight to data having a small distance. Therefore, any influence of erroneous detection is eliminated.

In L. Vacchetti, V. Lepetit, and P. Fua, "Combining edge and texture information for real-time accurate 3D camera tracking", Proceedings of the Third IEEE and ACM International Symposium on Mixed and Augmented Reality (ISMAR04), PP. 48-57, 2004 (hereinafter referred to as "Document 5"), a plurality of candidate points are extracted and stored in the search step (2), and the closest points to the projected line segments are selected from among the plurality of candidate points each time the step (3) is repeated. Therefore, any influence of erroneous detection is eliminated.

In H. Wuest, F. Vial, and D. Stricker, "Adaptive Line Tracking with Multiple Hypotheses for Augmented Reality", Proceedings of the Fourth IEEE and ACM International Symposium Mixed and Augmented Reality (ISMAR05), PP. 62-69, 2005 (hereinafter referred to as "Document 6"), information concerning visual properties of edges near line segments on an image is held to eliminate the influence of erroneous detection caused by changes in lighting or changes in point of view.

Methods for determining the position and orientation of an image pickup apparatus using point features, rather than edges, on an image are disclosed in G. Simon, A. W. Fitzgibbon, and A. Zisserman, "Markerless Tracking using Planar Structures in the Scene", Proc. Int'l Symp. on Augmented Reality 2000 (ISAR2000), PP. 120-128, 2000 (hereinafter referred to as "Document 7"), and I. Skrypnyk and D. G. Lowe, "Scene Modelling, Recognition and Tracking with Invariant Image features", Proc. The Third Int'l Symp. on Mixed and Augmented Reality (ISMAR04), PP. 110-119, 2004 (hereinafter referred to as "Document 8").

Point features are features represented in terms of position (image coordinates) on an image and image information around. For example, point features are detected using the Harris operator, Moravec operator, or the like.

In Document 7, point features on the same plane in a three-dimensional space are tracked in successive frames, and the position and orientation of an image pickup apparatus are calculated on the basis of the relationship between the positions of these points on the plane and the image coordinates of the corresponding point features.

In Document 8, the position and orientation of an image pickup apparatus are determined using point features having feature information invariant to scale change and rotation change on an image on the basis of correspondences between image coordinates and three-dimensional coordinates of the point features. In Document 8, point features are not tracked in successive frames. On the contrary, matching is performed between a predetermined point feature database and point features detected in the current frame to identify the point features in every frame.

The point-feature-based methods also have a problem of erroneous detection, like the edge-based methods. In Documents 7 and 8, point features detected as outliers are removed using the Random Sample Consensus (RANSAC) algorithm. In the RANSAC-based outlier removal scheme, corresponding points are selected at random, and the position and orientation of the image pickup apparatus are calculated. When the number of corresponding points meeting the calculated values is the maximum, corresponding points that are not included in the set of the corresponding points are removed as outliers.

There is a method of the related art using artificial markers, in which erroneous detection of the markers is prevented using chroma-keying. ProSet and SmartSet systems, which are virtual studio systems of Orad Hi-Tec systems Ltd., utilize traditional blue or green screen chroma-key techniques to separate a human figure from a background.

On the background, an artificial pattern for registration having a color similar to that of the background is placed, and the position and orientation of a camera are estimated using the detected pattern on the captured image. Since the registration pattern is separated as the background from the human figure using chroma-keying, the registration pattern may not be erroneously detected on the human image. Therefore, stable estimation of the position and orientation of the camera can be achieved. Furthermore, since the registration pattern is removed as the background using chroma-keying, the registration pattern is not observed on a composite image in which a computer graphics (CG) image is rendered on the background.

The above-described technique to avoid erroneous detection of the markers, proposed by Orad Hi-Tec systems Ltd., is a technique for use in virtual studio applications. In a virtual studio, a human figure is extracted from the background, and a CG image is rendered onto a background portion so as to be combined with an image of the human figure. Therefore, a blue screen can be used as a background, and the background can be extracted using chroma-keying.

In AR systems, however, a CG image is superimposed on a real background image. Therefore, it is difficult to extract the background by performing simple processing such as chroma-keying, and it is also difficult to adopt the technique proposed by Orad Hi-Tec systems Ltd. to avoid erroneous detection of natural features on the background image.

In the related art, the process for detecting natural features for registration and the process for determining the in-front/behind relationship between a virtual object and a real occluding object such as a hand are separately performed. In an image region where the occluding object is in front of the virtual object, the natural features used for registration must not be detected. Therefore, it can be expected that erroneous detection may be prevented by using information concerning the in-front/behind relationship for image feature detection. In the related art, however, information concerning the in-front/behind relationship is not used for natural feature detection.

A measurement device arranged to measure the position and orientation of an occluding object allows the in-front/behind relationship between an observation target object and the occluding object to be determined using measurement results of the measurement device. In the related art, however, information concerning the measured position and orientation of the occluding object is not used for natural feature detection.

SUMMARY OF THE INVENTION

The present invention provides a technique in which erroneous detection of image features can be prevented when an observation target object is occluded by an occluding object and registration stability can be improved.

The present invention further provides a technique using a measurement device arranged to measure the position and orientation of an occluding object, in which erroneous detection of image features can be prevented using information obtained from the measurement device when an observation target object is occluded by the occluding object and registration stability can be improved.

The present invention provides an image processing apparatus including an object defining unit configured to define a specific object that can occlude a target object to be observed; an image obtaining unit configured to obtain a captured image captured by an image pickup apparatus; a region detector configured to detect a region including the specific object from the obtained captured image; an image feature detector configured to detect image features of the target object from the captured image; and a calculating unit configured to calculate a position and/or orientation of the image pickup apparatus that captured the captured image or a position and/or orientation of the target object in the captured image on the basis of the image features detected by the image feature detector, wherein the image processing apparatus is configured not to take into account features from the detected region in determining the position and/or orientation of the image-pickup apparatus that captured the image or a position and/or orientation of the target object in the captured image.

The present invention further provides an image processing method including a holding step of holding definition information defining a specific object that can occlude a target object to be observed; an image obtaining step of obtaining a captured image captured by an image pickup apparatus; a region detecting step of detecting a region including the specific object from the obtained captured image; an image feature detecting step of detecting image features of the target object from the captured image; and a calculating step of calculating a position and/or orientation of the image pickup apparatus that captured the captured image or a position and/or orientation of the target object in the captured image on the basis of the image features detected in the image feature detecting step, wherein the method does not take into account features from the detected region in determining the position and/or orientation of the image-pickup apparatus that captured the image or a position and/or orientation of the target object in the captured image.

Further features of the present invention will become apparent from the following description of exemplary embodiments with reference to the attached drawings.

BRIEF DESCRIPTION OF THE DRAWINGS

FIG. 3 is a flowchart showing the processing operation of the position and orientation measurement apparatus according to the first embodiment.

FIGS. 4A, 4B, 4C, and 4D are diagrams showing a method for defining a three-dimensional model according to the first embodiment.

FIG. 7 is a flowchart showing a procedure of an image feature detection process according to the first embodiment.

FIG. 12 is a diagram showing detection of an occluding region according to a modification example of the first embodiment.

DESCRIPTION OF THE EMBODIMENTS

Embodiments of the present invention will be described in detail with reference to the drawings.

First Embodiment

A first embodiment of the present invention will be described with respect to a registration method using edges detected on an image. More specifically, a position and orientation measurement apparatus and a position and orientation measurement method for determining the position and orientation of an observer relative to an observation target object observed by the observer when the observation target is occluded by a hand of the observer will be described.

Figure 1:
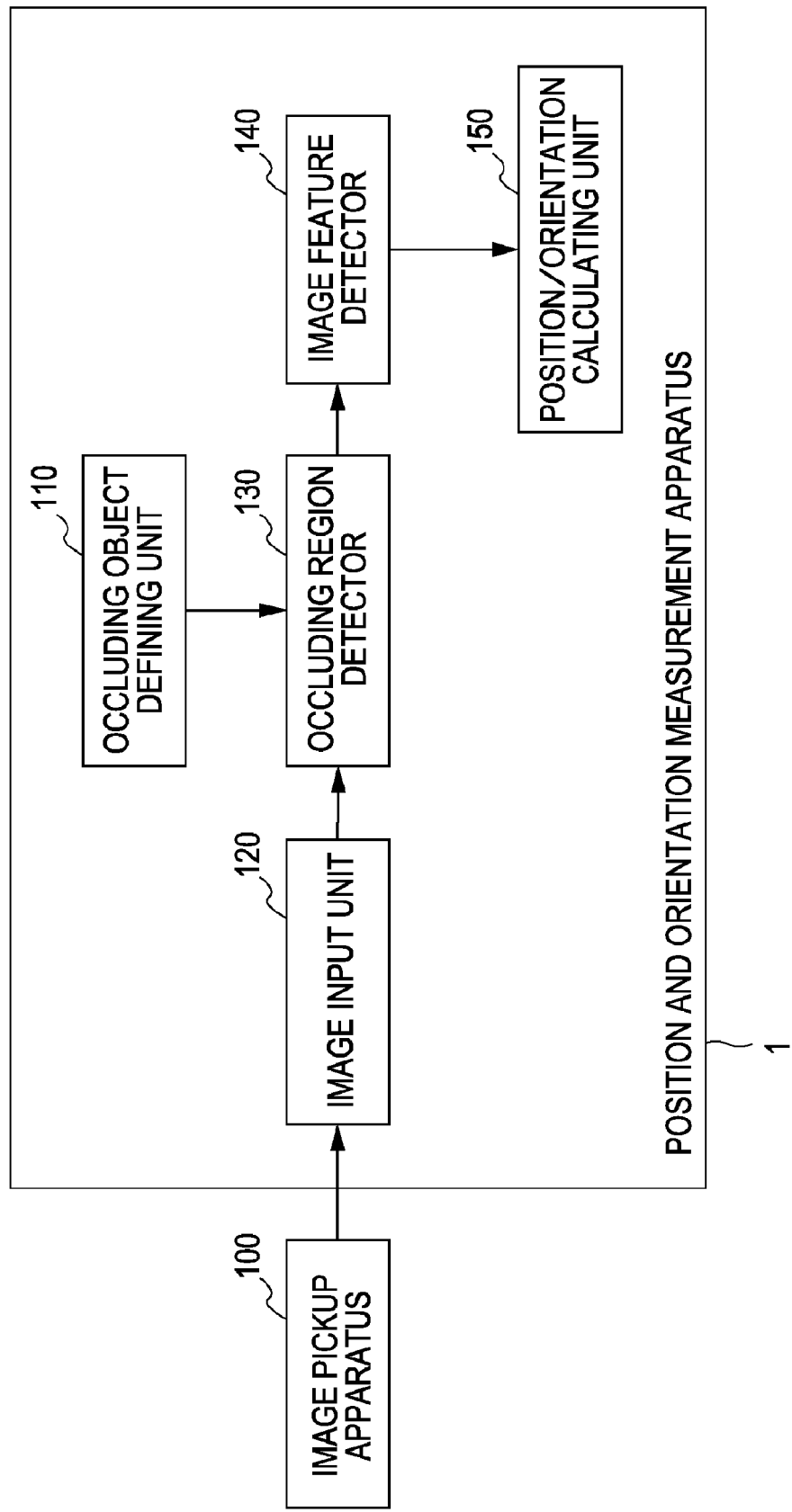
FIG. 1 is a diagram showing an example structure of a position and orientation measurement apparatus according to a first embodiment of the present invention.

FIG. 1 shows an example structure of a position and orientation measurement apparatus 1 according to the first embodiment. As shown in FIG. 1, the position and orientation measurement apparatus 1 includes an occluding object defining unit 110, an image input unit 120, an occluding region detector 130, an image feature detector 140, and a position/orientation calculating unit 150. An image pickup apparatus 100 is connected to the image input unit 120.

Figure 2:
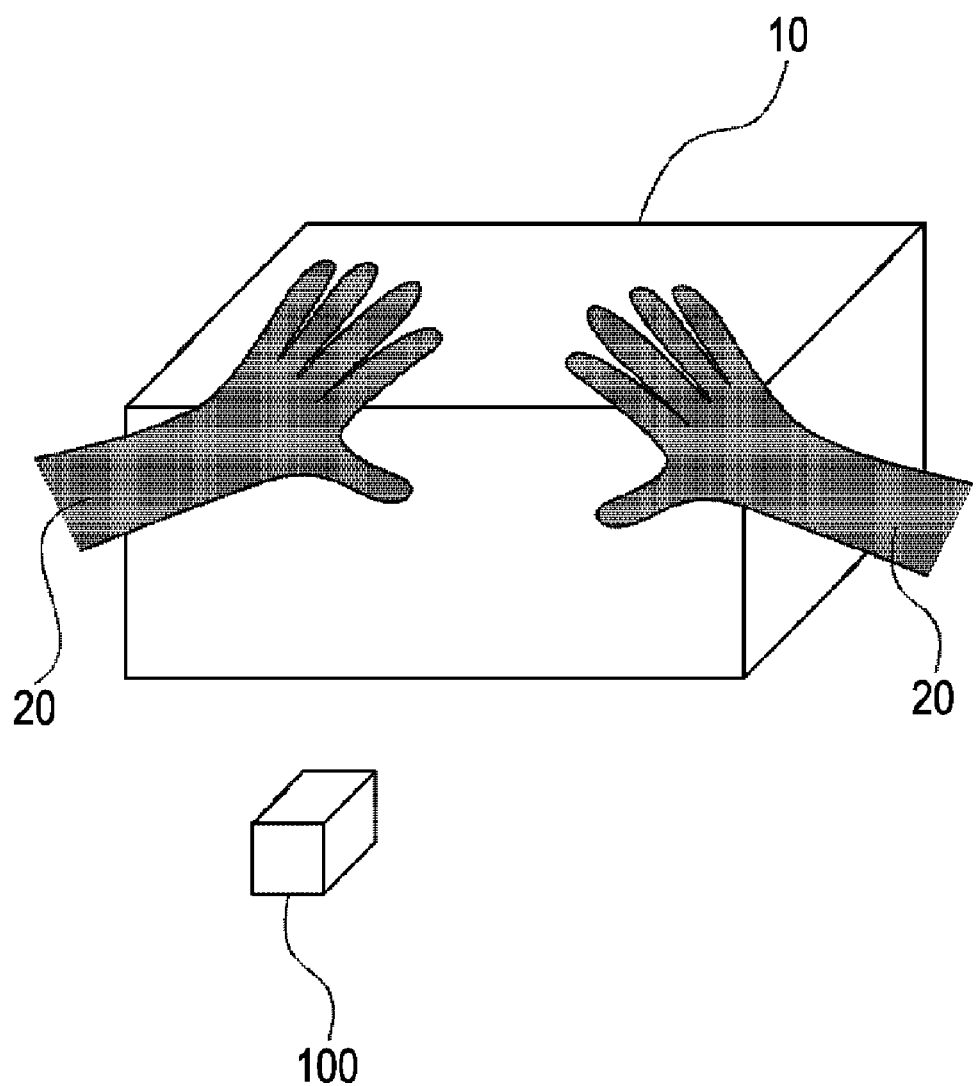
FIG. 2 is a diagram showing an example typical situation where the position and orientation measurement apparatus according to the first embodiment is applied.

FIG. 2 is a diagram showing a typical situation where the position and orientation measurement apparatus 1 according to the first embodiment is applied. An observer wears the image pickup apparatus 100, and an observation target object 10, which is a real object, is partially occluded by hands 20 of the observer. The position and orientation measurement apparatus 1 according to the first embodiment is configured to determine the position and orientation of the image pickup apparatus 100 relative to the observation target object 10.

In the first embodiment, an observation target object is located behind an occluding object, i.e., an observer's hand.

The occluding object defining unit 110 defines an occluding object in advance before position and orientation measurement, and stores the definition of the occluding object in a storage unit (not shown). In the first embodiment, the occluding object defining unit 110 defines the color of a hand. On an image, pixels corresponding to a region having the same color as the hand can represent an object occluded by the hand. In the definition of the color of the hand, for example, a representative value of the color of the hand may be represented by three components of red (R), green (G), and blue (B), and a range of values available for each of the components may be designated. An elliptic region in an RGB space using the RGB components as three orthogonal axes may also be defined. Alternatively, an elliptic region in a UV plane using U and V components as two orthogonal axes, wherein the U and V components are color components in a YUV color space, may be defined instead of the RGB components. The method for defining the color of a hand is not limited to those described above, and any other definition method for representing a color or a color region may be used.

The image input unit 120 receives an image captured by the image pickup apparatus 100. The image input unit 120 is implemented by a video capture board if the output of the image pickup apparatus 100 is compatible with analog output formats such as NTSC (National Television System Committee). If the output of the image pickup apparatus 100 is compatible with digital output formats such as IEEE (Institute of Electrical and Electronic Engineers) 1394, the image input unit 120 is implemented by, for example, an IEEE 1394 interface board.

The occluding region detector 130 detects an occluding region of the captured image input from the image input unit 120 where the observation target object is occluded by the occluding object defined by the occluding object defining unit 110. The detected occluding region is output to the image feature detector 140.

The image feature detector 140 detects an image feature on the image input from the image input unit 120. Image features are detected only in a region other than the occluding region detected by the occluding region detector 130. The detected image features are output to the position/orientation calculating unit 150.

The position/orientation calculating unit 150 calculates the position and orientation of the image pickup apparatus 100 relative to the observation target object 10 on the basis of information concerning the image features detected by the image feature detector 140.

The processing operation of the position and orientation measurement apparatus 1 according to the first embodiment will now be described.

FIG. 3 is a flowchart showing the processing operation of the position and orientation measurement apparatus 1 according to the first embodiment.

First, in step S1010, initialization is performed. In the initialization processing of step S1010, an occluding object is defined, and the position and orientation of the image pickup apparatus 100 relative to the observation target object are roughly determined. The occluding object in the first embodiment is an observer's hand, and a color region representing the color of the hand is designated. In the designation process of the color region, for example, an image including the hand as the occluding object is captured in advance, and a hand region is specified in the image using a mouse. The color of the hand region is mapped onto a UV plane, and an elliptic area including the mapped hand region on the UV plane is designated as a color region representing the color of the hand.

A position and orientation measurement method described below according to the first embodiment is a method of updating the rough position and orientation of the image pickup apparatus 100 using information concerning image features. Therefore, the position and orientation of the image pickup apparatus 100 need to be roughly determined in advance prior to the position and orientation measurement. For example, a predetermined position and orientation may be designated, and the image pickup apparatus 100 may be moved to the designated position and orientation.

Alternatively, as disclosed in H. Kato and M. Billinghurst, "Marker Tracking and HMD Calibration for a Video-Based Augmented Reality Conferencing System", Proc. The 2nd IEEE International Workshop on Augmented Reality (IWAR '99), pp. 85-94, 1999, an artificial marker that is identifiable once it is detected in an image may be used. In this case, three-dimensional positions of vertices of the marker are measured, and the position and orientation of the image pickup apparatus 100 are determined from correspondences between image coordinates and three-dimensional positions of the vertices of the artificial marker. The determined position and orientation may be designated as a rough position and orientation of the image pickup apparatus 100.

Alternatively, a magnetic, optical, or ultrasonic position and orientation sensor with six degrees of freedom may be attached to the image pickup apparatus 100, and the position and orientation of the image pickup apparatus 100 obtained from the sensor may be designated as a rough position and orientation of the image pickup apparatus 100. The position and orientation of the image pickup apparatus 100 may be measured using a combination of an artificial marker and the above-described position and orientation sensor with six degrees of freedom or an orientation sensor with three degrees of freedom and a position sensor with three degrees of freedom, and the determined position and orientation may be designated as a rough position and orientation of the image pickup apparatus 100. After the initialization is performed, the process proceeds to step S1020.

In step S1020, an image captured by the image pickup apparatus 100 is loaded into the position and orientation measurement apparatus 1 via the image input unit 120. The image loaded in step S1020 is transmitted to the occluding region detector 130 and the image feature detector 140.

Then, in step S1030, an occluding region is detected. Pixels corresponding to the color region representing the color of the hand designated in step S1010 are detected from the image, and are labeled to generate connected regions. Each of the connected regions is dilated to remove noise. The remaining connected regions are output to the image feature detector 140 as occluding regions.

Figure 10A:
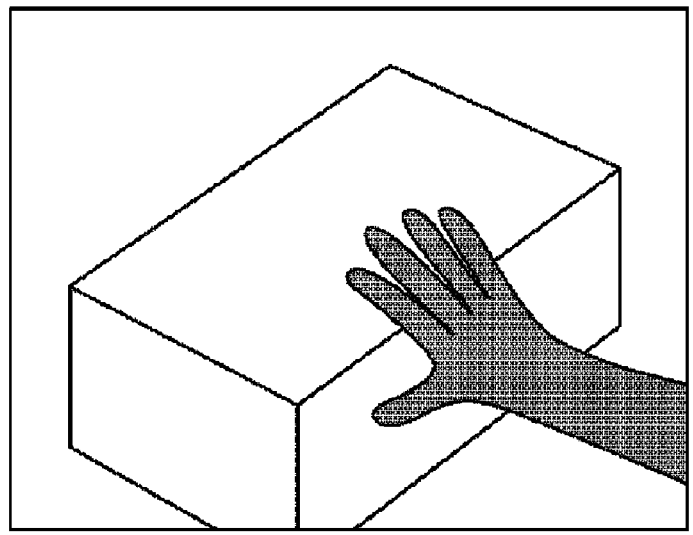
FIGS. 10A and 10B are diagrams showing detection of an occluding region according to the first embodiment.
Figure 10B:
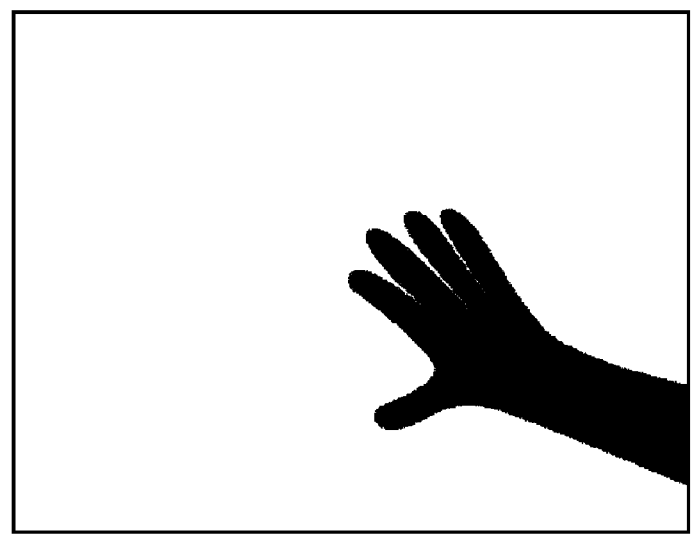

FIGS. 10A and 10B are diagrams showing detection of an occluding region according to the first embodiment. FIG. 10A shows an image captured by the image pickup apparatus 100, in which an observation target object is occluded by a hand. Which pixel in the captured image is occluded by the hand is determined using flags $F_i$ ($i=1, 2, \ldots, n$) each associated with one of the pixels and indicating whether or not the corresponding pixel is occluded, where n denotes the number of pixels in the captured image. Initially, all the flags $F_i$ are set to value "0". Then, the flags $F_i$ associated with the pixels corresponding to the occluding region are set to value "1". The flags $F_i$ are output to the image feature detector 140 as data indicating the occluding region.

FIG. 10B shows a mask image represented in white and black, which is generated using the flags $F_i$. Image features are detected only in the white portion of the mask image.

Then, in step S1040, model projection is performed. Specifically, a three-dimensional model of the observation target object is projected onto the image on the basis of the rough position and orientation of the image pickup apparatus 100.

The model projection is performed using known camera internal parameters such as focal length and principal point. In the first embodiment, the camera internal parameters are measured in advance and are thus known.

FIGS. 4A, 4B, 4C, and 4D are diagrams showing a method for defining a three-dimensional model according to the first embodiment. The three-dimensional model is defined by a set of points, information concerning surfaces defined by connecting the points, and information concerning line segments bounding the surfaces.

Figures 4A, 4B:
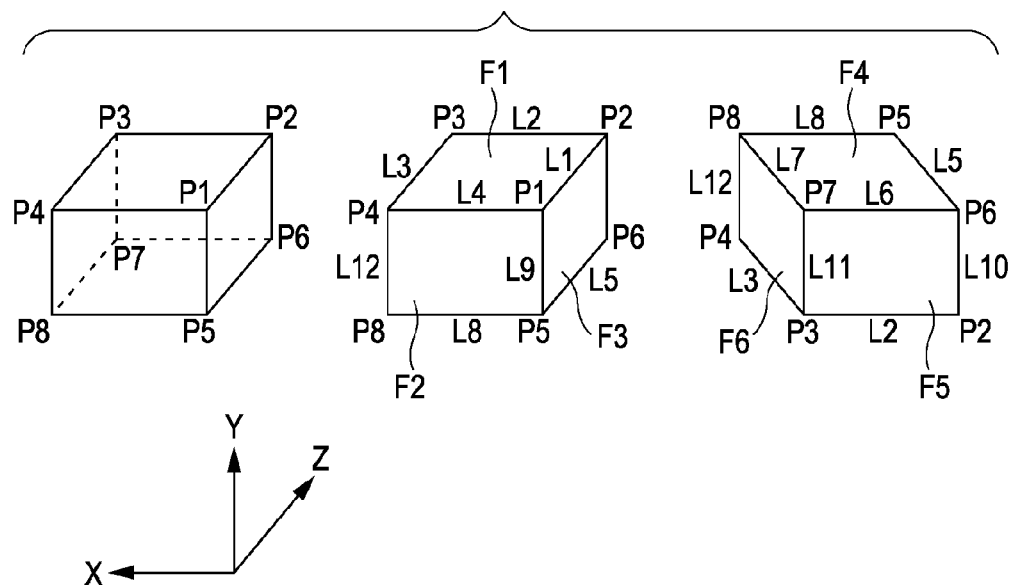

As shown in the left portion of FIG. 4A, the three-dimensional model in the first embodiment has a rectangular parallelepiped shape with eight points P1 to P8, and the coordinate system of the rectangular parallelepiped model is defined with an X-axis extending in the direction from the point P1 to the point P4, a Y-axis extending in the direction from the point P5 to the point P1, and a Z-axis extending in the direction from the point P1 to the point P2. The origin is set at the point P5. As shown in the middle and right portions of FIG. 4A, the rectangular parallelepiped model is defined by surfaces F1 to F6.

The rectangular parallelepiped model is also defined by line segments L1 to L12. As shown in FIG. 4B, each of the points P1 to P8 is represented by three-dimensional coordinate values. As shown in FIG. 4C, each of the surfaces F1 to F6 is represented by IDs of points defining that surface and the order by which the points are connected. As shown in FIG. 4D, each of the line segments L1 to L12 is represented by IDs of two end points thereof.

Figure 5A:
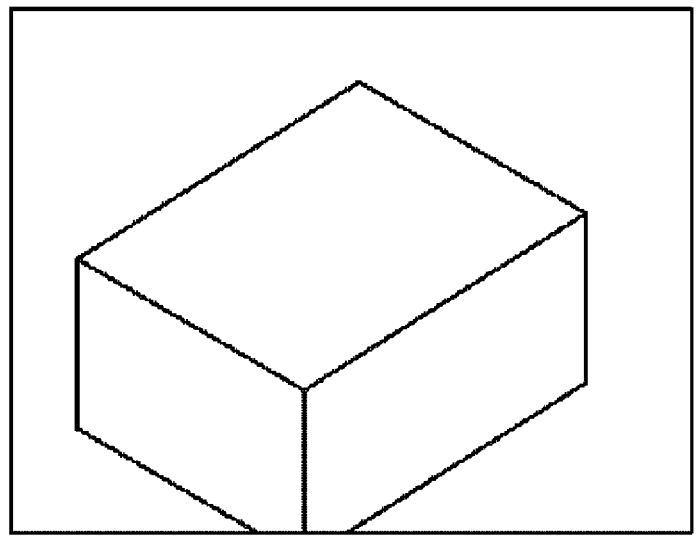
FIGS. 5A and 5B are diagrams showing projection of the three-dimensional model onto an image.
Figure 5B:
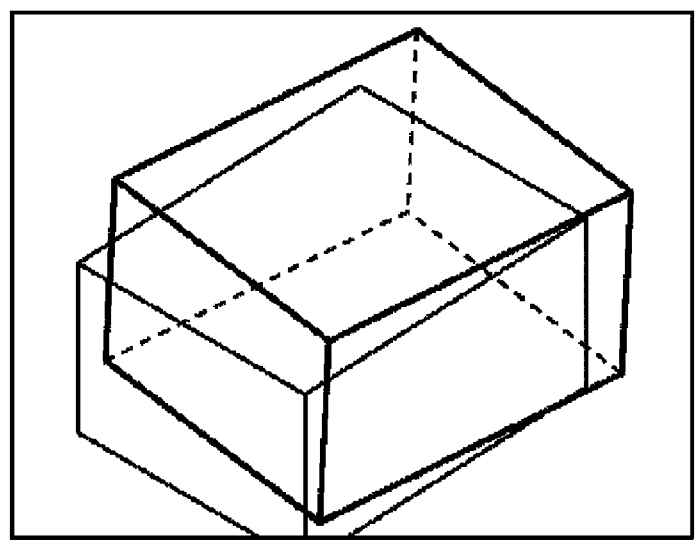

FIGS. 5A and 5B are diagrams showing projection of the three-dimensional model onto the image in step S1040. FIG. 5A shows the captured image, and FIG. 5B shows an image in which the three-dimensional model is projected on the captured image.

When a motion occurs between the image pickup apparatus 100 and the observation target object 10 in successive frames, as shown in FIG. 5B, a deviation occurs between the actually captured image and the projected image of the three-dimensional model indicated by bold lines. In FIG. 5B, broken lines indicate hidden line segments that cannot be observed from the position and the orientation.

Then, in step S1050, image features are detected. The image features are detected as follows.

Figure 6:
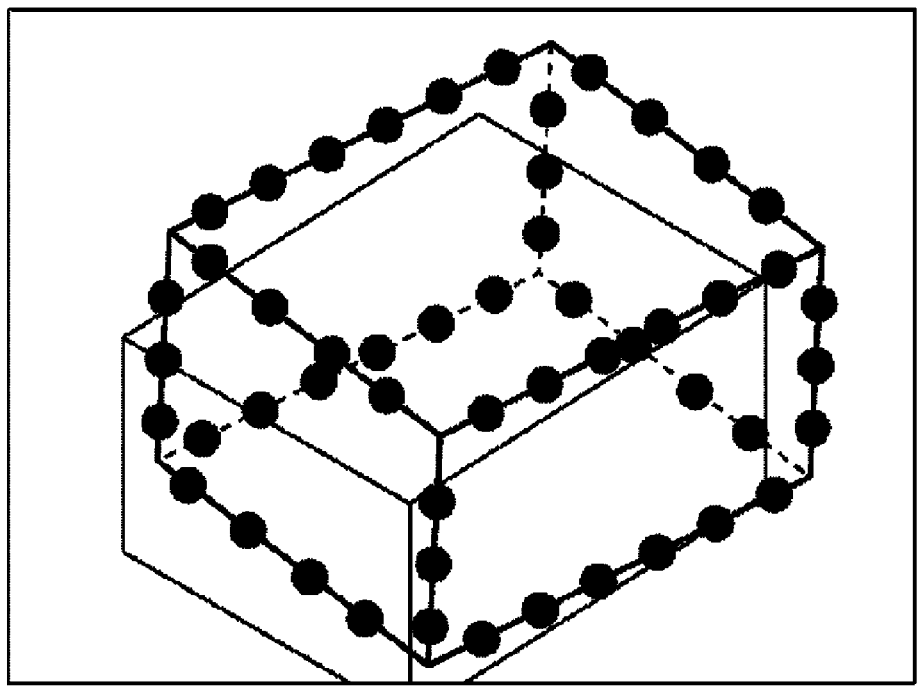
FIG. 6 is a diagram showing division points plotted on an image of the three-dimensional model.

First, division points are set so that the line segments defining the projected three-dimensional model can be divided into equal intervals on the image. FIG. 6 is a diagram showing the division points on the image of the three-dimensional model. The total number of division points is N, and each of the division points is denoted by DPi (i=1, 2, ..., N). The number N of division points can be controlled by changing the intervals between the division points on the image. The intervals between the division points on the image may be changed in every frame so that the number of division points can be constant.

The image feature detection process performed in step S1050 will now be described with reference to a flowchart shown in FIG. 7.

First, in step S1110, the variable "i" is set to 1. Then, in step S1120, it is determined whether or not a given division point DPi is visible. Specifically, if the division point DPi is occluded by another surface of the three-dimensional model, i.e., if the division point DPi lies on the broken lines shown in FIG. 6, the division point DPi is not visible. The determination as to whether or not the division point DPi is visible can be performed by, for example, as disclosed in Document 8, rendering the division point DPi after rendering the three-dimensional model using graphics hardware, and determining whether or not a depth buffer has been updated in the graphics hardware. If the division point DPi is not visible, the process proceeds to step S1150. If the division point DPi is visible, the process proceeds to step S1130.

In step S1130, it is determined whether or not the division point DPi is occluded by the occluding object designated in step S1010. Specifically, if the value of an occluding region flag Fj associated with the image coordinates of the division point DPi is 1, it is determined that the division point DPi is occluded by the occluding object. If the value of the flag Fj is 0, it is determined that the division point DPi is not occluded. If it is determined that the division point DPi is occluded, the process proceeds to step S1150. If it is determined that the division point DPi is not occluded, the process proceeds to step S1140, and an image feature is detected.

Figure 8A:
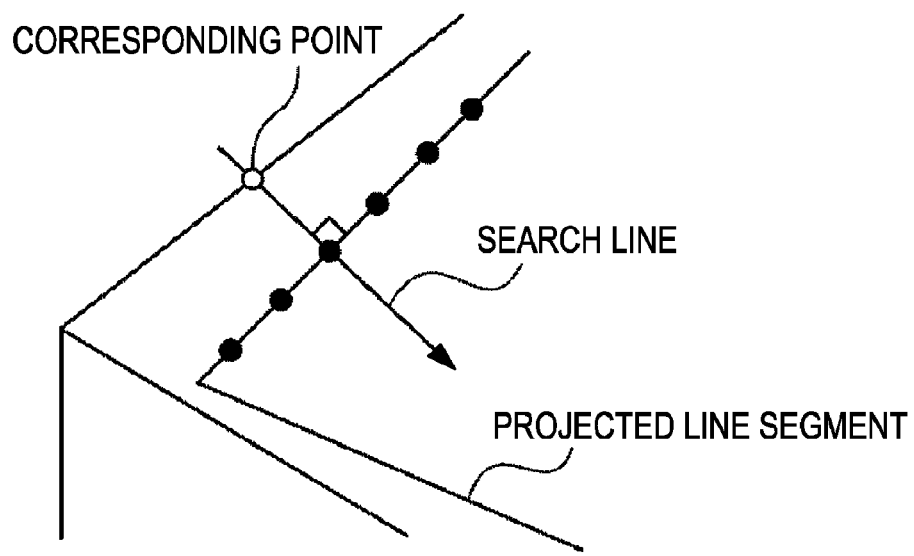
FIGS. 8A and 8B are diagrams showing a method for detecting an image feature according to the first embodiment.
Figure 8B:
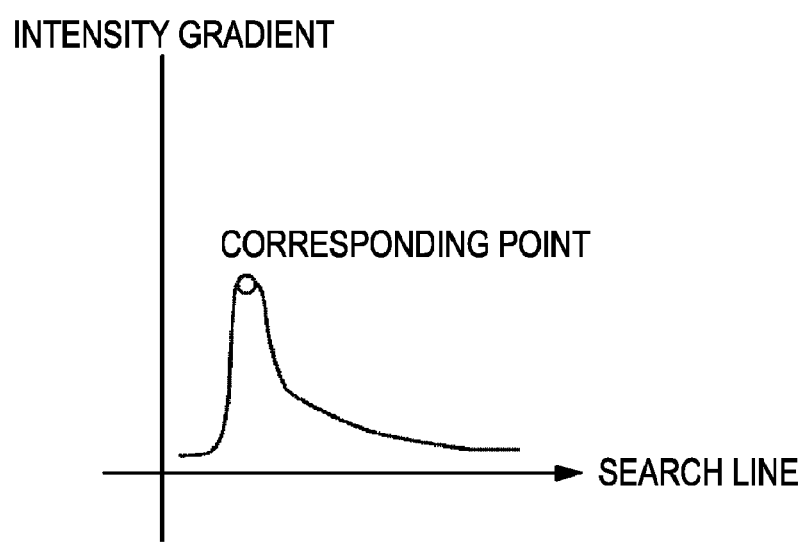

In step S1140, an image feature corresponding to the division point DPi is detected. In the first embodiment, image features are edges. FIGS. 8A and 8B are diagrams showing a method for detecting an image feature according to the first embodiment. As shown in FIG. 8A, for each of the division points, an edge is one-dimensionally searched for along a line segment (hereinafter referred to as a "search line") parallel to the normal to the projected line segment and passing through the division point. It is to be noted that if the value of an occluding region flag Fj associated with the image coordinates of a pixel on a search line is 1, edge detection is not performed on the pixel on the search line. Further, there is a possibility of the image coordinates of a pixel on a search line may have non-integer values. In this case, for example, an average of occluding region flags is determined by bilinear interpolation using the values of the occluding region flags Fj for four nearby points. If the average is greater than 0.5, it is determined that the corresponding pixel is occluded, and edge detection is not performed. An edge is present on a search line at a position where the intensity gradient has an extreme value (see FIG. 8B). In the first embodiment, if a plurality of edges are present on a search line, the closest edge to the division point is designated as a corresponding point, and image coordinates of the corresponding point and three-dimensional coordinates of the division point are stored. While in the first embodiment, the closest edge to the division point is designated as a corresponding point, the corresponding point is not limited to that edge, and an edge exhibiting the largest absolute value of an extreme value of the intensity gradient may be designated as a corresponding point. Alternatively, as disclosed in Document 7, a plurality of points rather than one point may be stored as candidate corresponding points within the scope of the present invention.

In step S1150, the variable "i" is incremented by one, and the process proceeds to step S1160. If the process has been completed for all division points DPi, the process ends; otherwise, the process returns to step S1120.

Figure 9:
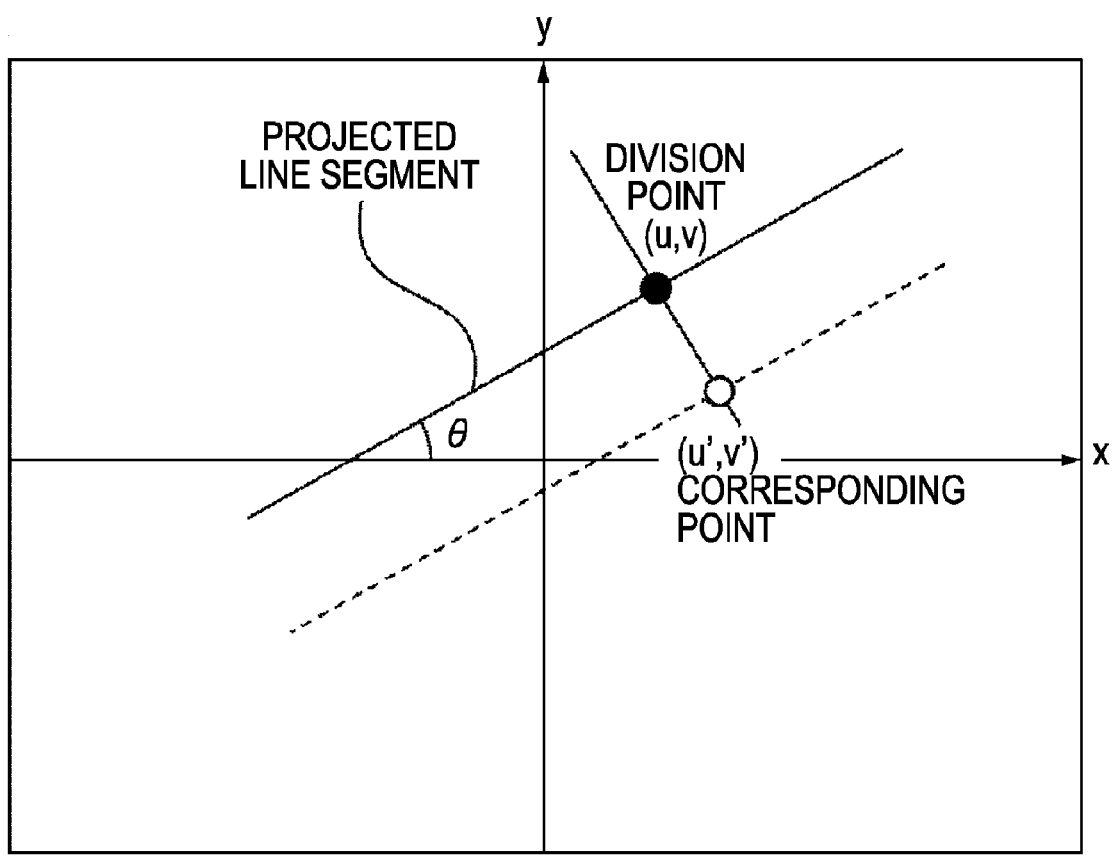
FIG. 9 is a diagram showing a method for calculating the position and orientation of an image pickup apparatus using line segment information.

If the process has been completed for all division points DPi, in step S1060 shown in FIG. 3, the position and orientation of the image pickup apparatus 100 are determined. The number of division points whose corresponding points have been determined in step S1140 from among the division points DPi is denoted by Nc. The position and orientation of the image pickup apparatus 100 are determined by correcting the rough position and orientation of the image pickup apparatus 100 through iterative calculations. FIG. 9 is a diagram showing a method for calculating the position and orientation of the image pickup apparatus 100 using line segment information. In FIG. 9, the x-axis and the y-axis are plotted in the horizontal direction and vertical direction of the image, respectively. The coordinates of a given division point is represented by (u, v), and a line segment L to which the given division point belongs on the image is inclined at an inclination θ with respect to the x-axis. The normal vector of the line segment L is represented by (sin θ, −cos θ). The coordinates of the corresponding point of the division point is represented by (u', v'). A point (x, y) on the line segment L satisfies Eq. (1)

$$x \sin \theta - y \cos \theta = r \qquad \text{Eq. (1)}$$

where r=u sin θ−v cos θ (constant). A point (x, y) on a straight line (indicated by a broken line shown in FIG. 9) parallel to the line L and passing through the corresponding point satisfies Eq. (2):

$$x \sin \theta - y \cos \theta = d \qquad \text{Eq. (2)}$$

where d=u' sin θ−v' cos θ (constant). The image coordinates of the division point are functions of the position and orientation of the image pickup apparatus 100. The position and orientation of the image pickup apparatus 100 has six degrees of freedom. It is assumed that a parameter indicating the position and orientation of the image pickup apparatus 100 is denoted by p. The parameter p is a six-dimensional vector having three elements representing the position of the image pickup apparatus 100 and three elements representing the orientation of the image pickup apparatus 100. Each of the three elements representing the orientation is represented by, for example, an Euler angle, or a three-dimensional vector whose direction and magnitude represent the rotation axis and rotation angle, respectively, or the like. By approximating (x, y), as the image coordinates of the division point, using the one-dimensional Taylor expansion in the vicinity of (u, v), the following expression is obtained:

$$x \approx u + \sum_{i=1}^{6} \frac{\partial x}{\partial p_i} \Delta p_i, \qquad \text{Ex. (3)}$$

$$y \approx v + \sum_{i=1}^{6} \frac{\partial y}{\partial p_i} \Delta p_i$$

where $$\frac{\partial x}{\partial p_i}, \frac{\partial y}{\partial p_i}$$

denote the partial differential coefficients called image Jacobian, and are derived using a known method disclosed in, for example, K. Satoh, S. Uchiyama, H. Yamamoto, and H. Tamura, "Robust Vision-Based Registration Utilizing Bird's-Eye View with User's View", Proceedings of the Second IEEE and ACM International Symposium on Mixed and Augmented Reality (ISMAR03), PP. 46-55, 2003 (hereinafter referred to as "Document 9"). A detailed description thereof is omitted.

A correcting value Δp of the position and orientation parameter p of the image pickup apparatus 100 is calculated so that the point (x, y) represented by Ex. (3) is present on the straight line represented by Eq. (2). Substituting Ex. (3) into Eq. (2) produces Eq. (4):

$$\left(u + \sum_{i=1}^{6} \frac{\partial x}{\partial p_i} \Delta p_i\right) \sin \theta - \left(v + \sum_{i=1}^{6} \frac{\partial y}{\partial p_i} \Delta p_i\right) \cos \theta = d \qquad \text{Eq. (4)}$$

Rearranging Eq. (4) yields Eq. (5):

$$\sin \theta \sum_{i=1}^{6} \frac{\partial x}{\partial p_i} \Delta p_i - \cos \theta \sum_{i=1}^{6} \frac{\partial y}{\partial p_i} \Delta p_i = d - r \qquad \text{Eq. (5)}$$

Since Eq. (5) is established for Nc division points, linear simultaneous equations for the correcting value Δp, like Eq. (6), are established:

$$\begin{bmatrix} \sin\theta_1 \frac{\partial x_1}{\partial p_1} - \cos\theta_1 \frac{\partial y_1}{\partial p_1} & \sin\theta_1 \frac{\partial x_1}{\partial p_2} - \cos\theta_1 \frac{\partial y_1}{\partial p_2} & \cdots & \sin\theta_1 \frac{\partial x_1}{\partial p_6} - \cos\theta_1 \frac{\partial y_1}{\partial p_6} \\ \sin\theta_2 \frac{\partial x_2}{\partial p_1} - \cos\theta_2 \frac{\partial y_2}{\partial p_1} & \sin\theta_2 \frac{\partial x_2}{\partial p_2} - \cos\theta_2 \frac{\partial y_2}{\partial p_2} & \cdots & \sin\theta_2 \frac{\partial x_2}{\partial p_6} - \cos\theta_2 \frac{\partial y_2}{\partial p_6} \\ \vdots & \vdots & \ddots & \vdots \\ \sin\theta_{N_c} \frac{\partial x_{N_c}}{\partial p_1} - \cos\theta_{N_c} \frac{\partial y_{N_c}}{\partial p_1} & \sin\theta_{N_c} \frac{\partial x_{N_c}}{\partial p_2} - \cos\theta_{N_c} \frac{\partial y_{N_c}}{\partial p_2} & \cdots & \sin\theta_{N_c} \frac{\partial x_{N_c}}{\partial p_6} - \cos\theta_1 \frac{\partial y_{N_c}}{\partial p_6} \end{bmatrix} \begin{bmatrix} \Delta p_1 \\ \Delta p_2 \\ \Delta p_3 \\ \Delta p_4 \\ \Delta p_5 \\ \Delta p_6 \end{bmatrix} = \begin{bmatrix} d_1 - r_1 \\ d_2 - r_2 \\ \vdots \\ d_{N_c} - r_{N_c} \end{bmatrix} \qquad \text{Eq. (6)}$$

Eq. (6) is simplified as Eq. (7):

$$J \Delta p = E \qquad \text{Eq. (7)}$$

From Eq. (7), the correcting value Δp is determined using the generalized inverse matrix $(J^T \cdot J)^{-1}$ of the matrix J.

However, edges may often be erroneously detected, and a robust estimation method described below is used. In general, a division point corresponding to an erroneously detected edge has a large error d−r. Therefore, the contribution to the simultaneous equations represented by Eqs. (6) and (7) is large, resulting in low accuracy of the correcting value Δp. To address this problem, a division point having a large error d−r is assigned a small weight, and a division point having a small error d−r is assigned a large weight. The weights are calculated using the Tukey function given by, for example, Eq. (8):

$$w(x) = \begin{cases} (1 - (x/c)^2)^2 & |x| \le c \\ 0 & |x| > c \end{cases} \qquad \text{Eq. (8)}$$

The weighting function is not limited to the Tukey function, and any other function that assigns a small weight to a division point having a large error d−r and a large weight to a division point having a small error d−r, such as the Huber function given by the following equation:

$$w(x) = \begin{cases} 1 & |x| \le k \\ k/|x| & |x| > k \end{cases}$$

Let the weight assigned to the division point DPi be denoted by $w_i$. A weighting matrix W is defined by Eq. (9):

$$W = \begin{bmatrix} w_1 & & & 0 \\ & w_2 & & \\ & & \ddots & \\ 0 & & & w_{N_c} \end{bmatrix} \quad \text{Eq. (9)}$$

The weighting matrix W is an Nc×Nc square matrix containing zeros except for the diagonal elements and the weights $w_i$ as the diagonal elements. The weighting matrix W is used to modify Eq. (7) into Eq. (10):

$$WJ\Delta p = WE \quad \text{Eq. (10)}$$

By solving Eq. (10) using Eq. (11) below, the correcting value Δp is determined:

$$\Delta p = (J^T W J)^{-1} J^T W E \quad \text{Eq. (11)}$$

The obtained correcting value Δp is used to update the rough position and orientation of the image pickup apparatus 100. In this way, the position and orientation of the image pickup apparatus 100 are determined in step S1060.

Then, in step S1070, it is determined whether or not the calculation of the position and orientation of the image pickup apparatus 100 has converged. If the correcting value determined in step S1060 is sufficiently small, or the total sum of the errors r−d is sufficiently small, or the total sum of the errors r−d does not change, it is determined that the calculation of the position and orientation of the image pickup apparatus 100 has converged, and the process proceeds to step S1080. If it is determined that the calculation has not converged, the position and orientation of the image pickup apparatus 100 updated in step S1060 are designated as a new rough position and orientation of the image pickup apparatus 100. Then, the process returns to step S1060, and the values θ, r, and d are re-calculated to determine the correcting value Δp again.

In step S1080, it is determined whether or not an instruction for finishing the position and orientation calculation process has been received. If the instruction has been received, the process ends, otherwise, the process returns to step S1020.

A virtual-space image is superimposed on the captured image using the position and orientation of the image pickup apparatus 100 obtained by the position and orientation measurement method described with reference to the flowchart shown in FIG. 3.

Figure 11A:
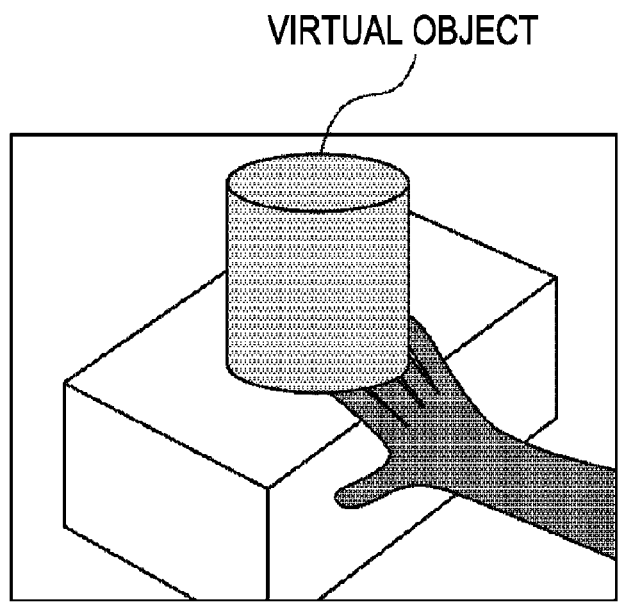
FIGS. 11A and 11B are diagrams showing a computer graphics superimposing (synthesizing) method according to the first embodiment.
Figure 11B:
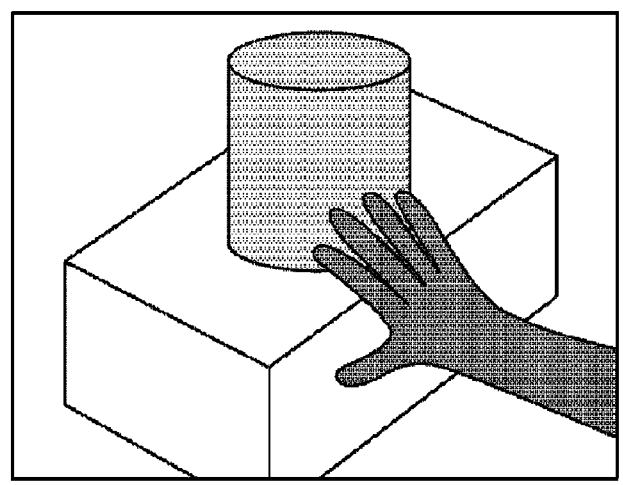

FIGS. 11A and 11B are diagrams showing a computer graphics superimposing (synthesizing) method according to the first embodiment. FIG. 11A shows an image generated without taking account of the occlusion relationship between a real object (e.g., a hand) and a virtual object (e.g., a virtual cylinder) in which an image of the virtual object generated on the basis of the position and orientation of the image pickup apparatus 100 is superimposed on the captured image. If the virtual object is located behind the hand, as shown in FIG. 11B, the virtual object needs to be rendered behind the hand. A region detected as the occluding region in the first embodiment is a hand region, and the image of the virtual object is not rendered in the pixels corresponding to the detected occluding region to generate a natural AR image shown in FIG. 11B.

Accordingly, in the first embodiment, an occluding region of an image where an occluding object occludes an observation target object on the image is detected, and no image features are detected in the occluding region. Therefore, the position and orientation of the observer relative to the observation target object can be stably calculated with high accuracy.

Modification Example of First Embodiment

In the first embodiment, an object occluding an observation target object is a hand but is not limited thereto, and may be any other object having features on a two-dimensional image, such as a face.

For example, as shown in FIG. 12, a database of face images is determined in advance, and a captured image is matched with the face images in the database. It is determined that a region of the image matched with the face images is occluded by a face, and no image features are detected in that region. With this method, stable high-accuracy position and orientation calculation can be achieved.

In the first embodiment, an occluding region is detected on the basis of the color of a hand. If an occluding object has a unique color, an occluding region may be detected on the basis of the unique color. For example, when a user wears orange-colored gloves on his/her hands, an orange-colored region in a captured image may be detected as an occluding region.

Alternatively, an occluding region may be detected on the basis of the figure pattern of the occluding object instead of the color. For example, when a user wears dot-patterned gloves on his/her hands, a dot-patterned region in a captured image may be detected as an occluding region.

Second Embodiment

In the first embodiment, a hand region is detected on a captured image and is designated as an occluding region. No image features are detected in the occluding region, thereby achieving stable high-accuracy calculation of the position and orientation of an observer relative to an observation target object.

In a second embodiment of the present invention, an occluding region is not detected using features on a two-dimensional image in the manner described in the first embodiment, but is detected from a captured image using a model of an occluding object and the rough position and orientation of the occluding object and an image pickup apparatus.

Figure 13:
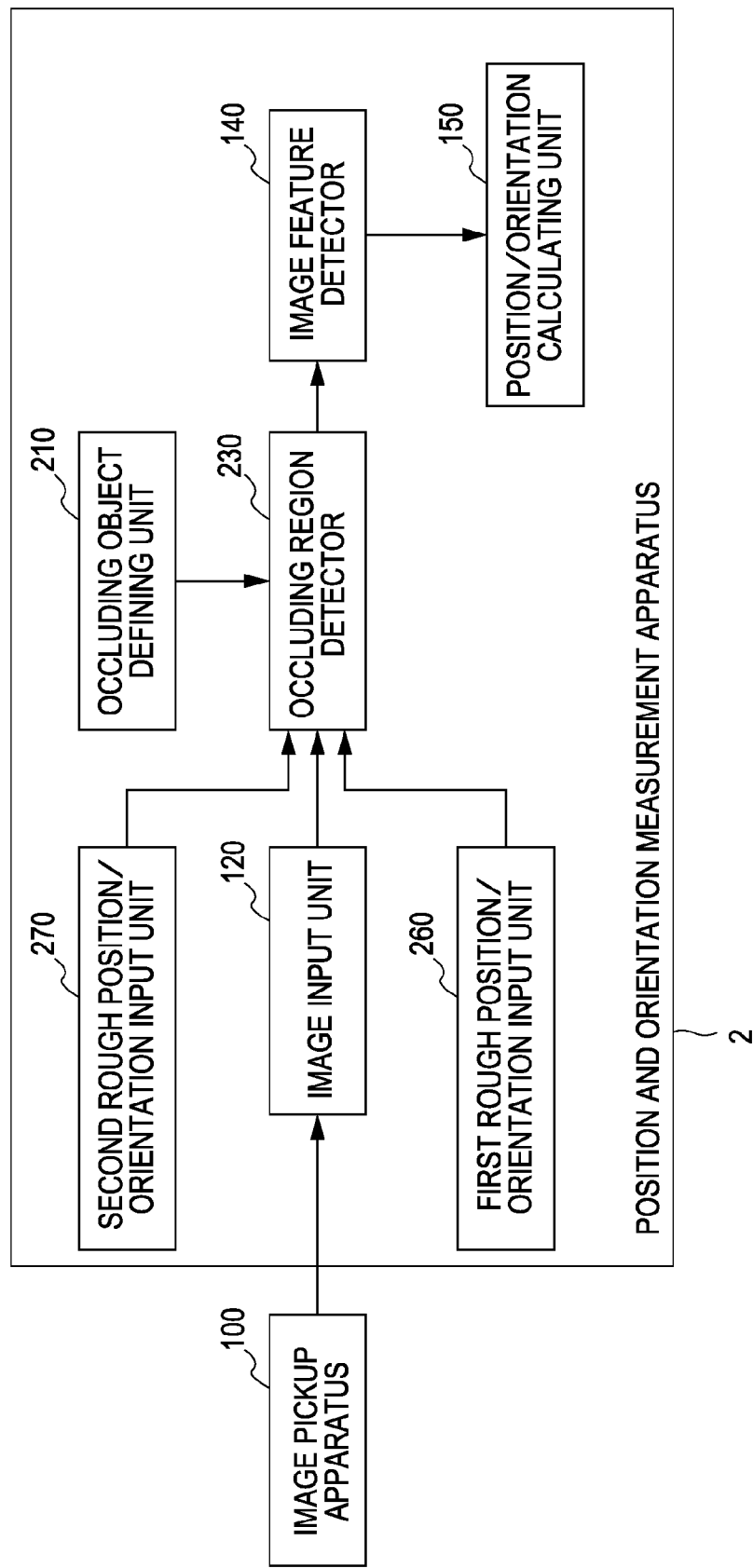
FIG. 13 is a diagram showing an example structure of a position and orientation measurement apparatus according to a second embodiment of the present invention.

FIG. 13 shows an example structure of a position and orientation measurement apparatus 2 according to the second embodiment. As shown in FIG. 13, an image pickup apparatus 100 is connected to the position and orientation measurement apparatus 2. The position and orientation measurement apparatus 2 includes an occluding object defining unit 210, an image input unit 120, an occluding region detector 230, an image feature detector 140, a position/orientation calculating unit 150, a first rough position/orientation input unit 260, and a second rough position/orientation input unit 270. Sections of the position and orientation measurement apparatus 2 having functions similar to those in the position and orientation measurement apparatus 1 shown in FIG. 1 are represented by the same reference numerals.

Figure 14:
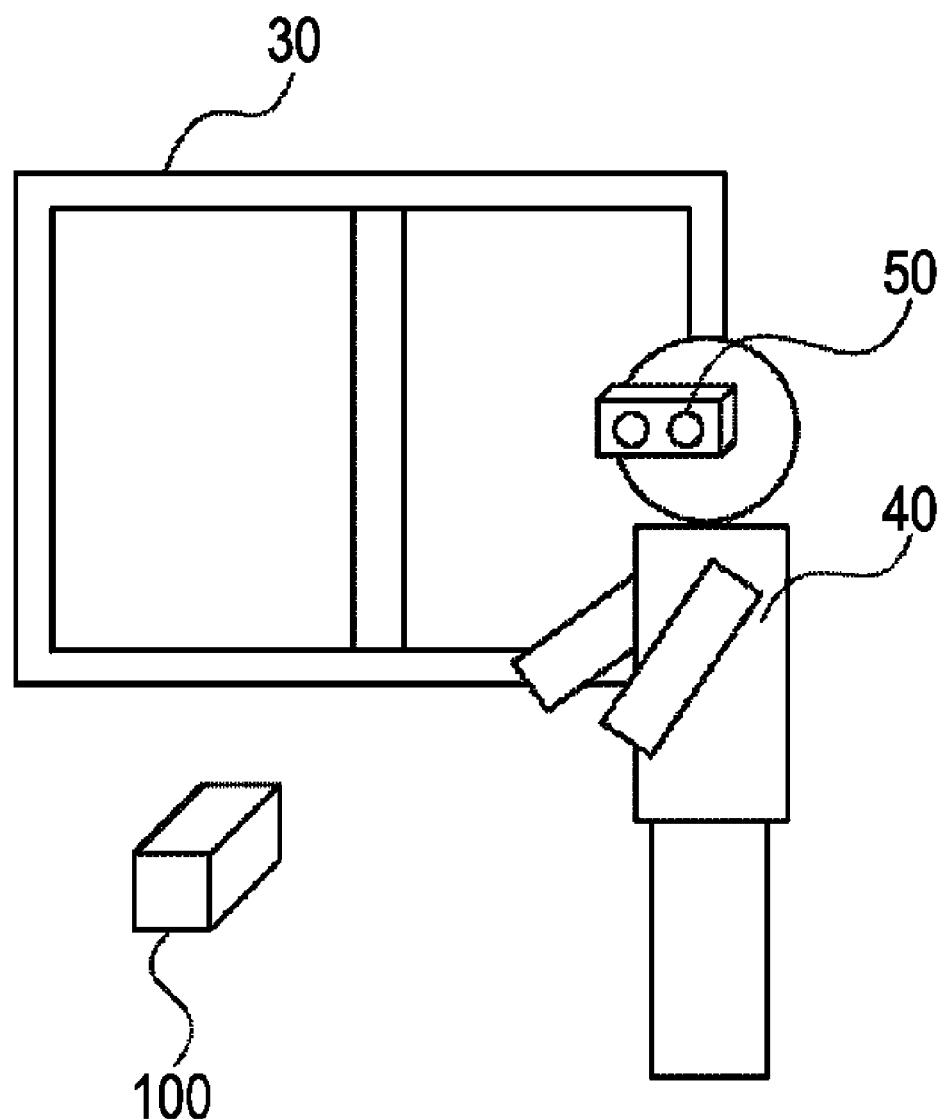
FIG. 14 is a diagram showing an example typical situation where the position and orientation measurement apparatus according to the second embodiment is applied.

FIG. 14 is a diagram showing a typical situation where the position and orientation measurement apparatus 2 according to the second embodiment is applied.

In a space observed by an observer, an observation target object 30 and a second observer 40 exist. The second observer 40 may occlude the observation target object 30. It is assumed that both observers are wearing HMDs and enjoying their AR experience. In FIG. 14, the second observer 40 is wearing a HMD 50. The position and orientation measurement apparatus 2 according to the second embodiment is configured to determine the position and orientation of the image pickup apparatus 100 relative to the observation target object 30.

The occluding object defining unit 210 defines an occluding object model. For example, the occluding object defining unit 210 defines a rectangular parallelepiped model containing a human-body object on the basis of a coordinate system of the HMD 50, and stores the definition of the model in a storage unit (not shown). The operation of the image input unit 120, the image feature detector 140, and the position/orientation calculating unit 150 is similar to that in the first embodiment, and a description thereof is thus omitted.

The first rough position/orientation input unit 260 inputs a rough position and orientation of the image pickup apparatus 100. The second rough position/orientation input unit 270 inputs a rough position and orientation of the second observer 40, that is, the HMD 50. The occluding region detector 230 detects an occluding region where the observation target object 30 is occluded in a captured image on the basis of position and orientation information obtained from the first rough position/orientation input unit 260 and the second rough position/orientation input unit 270, and the occluding object model defined by the occluding object defining unit 210. The detected occluding region is output to the image feature detector 140.

Figure 15:
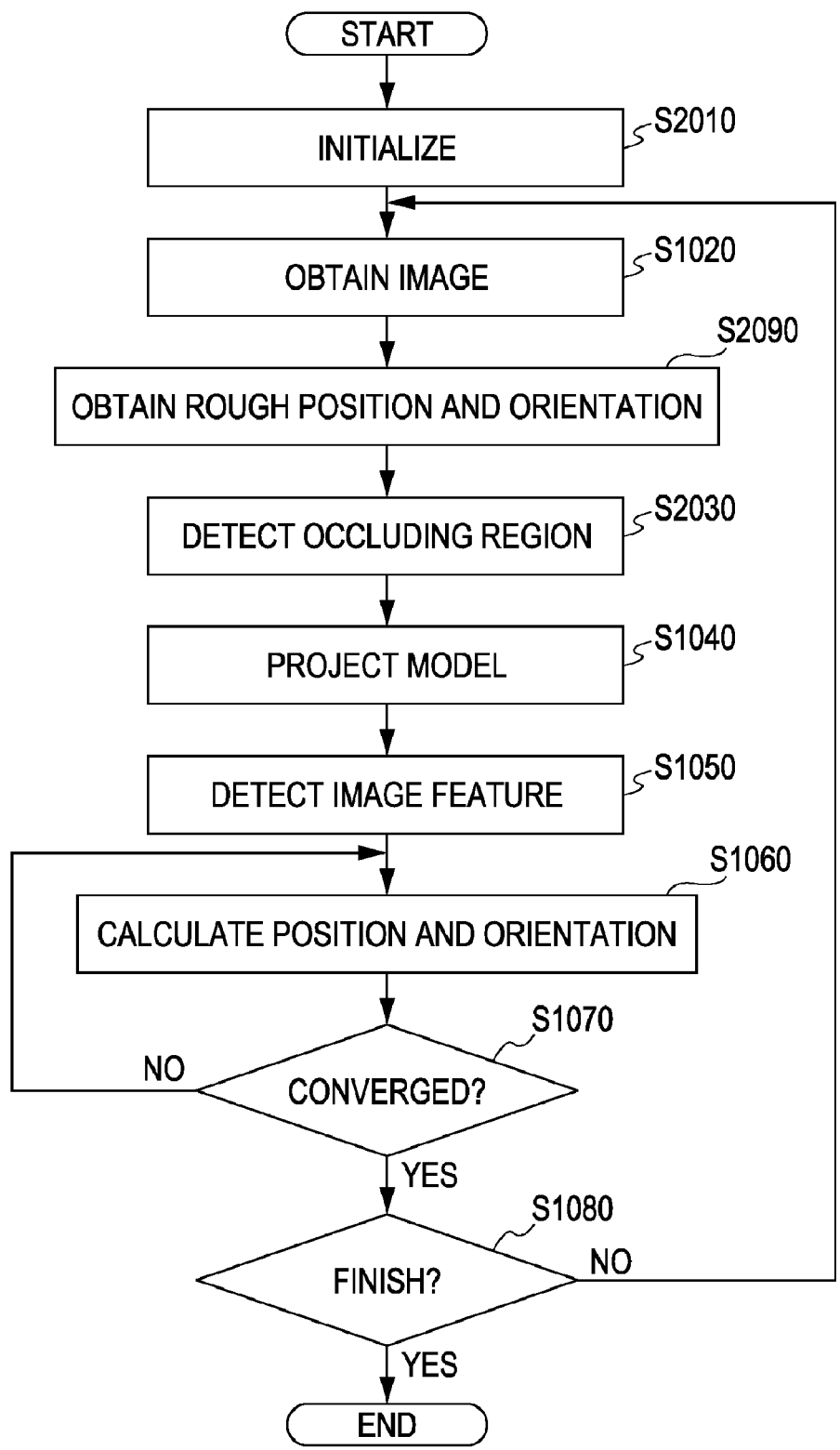
FIG. 15 is a flowchart showing a process procedure according to the second embodiment.

FIG. 15 is a flowchart showing a process procedure according to the second embodiment.

Figure 16:
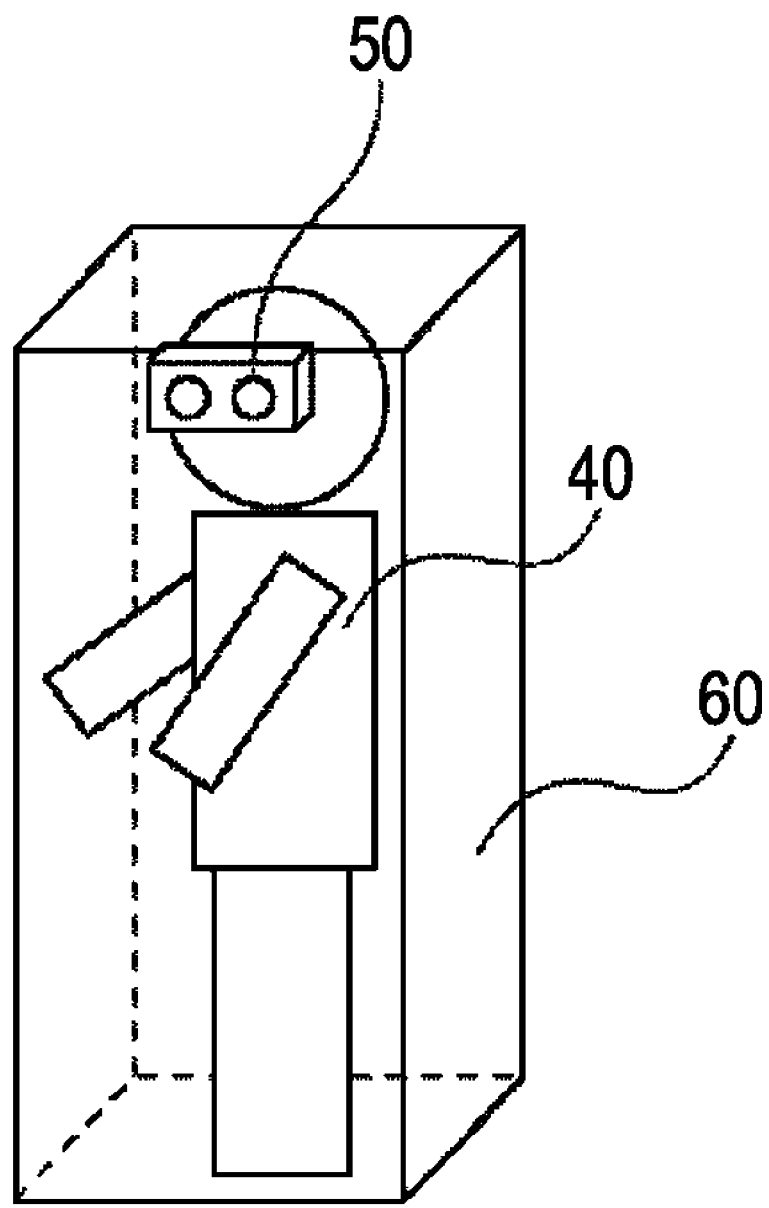
FIG. 16 is a diagram showing a definition method of a model of an occluding object according to the second embodiment.

First, in step S2010, initialization is performed. In the initialization processing of step S2010, an occluding object is defined, and the position and orientation of the image pickup apparatus 100 relative to the observation target object 30 are roughly determined. The occluding object in the second embodiment is the second observer 40, and, as shown in FIG. 16, a rectangular parallelepiped object 60 containing the second observer 40 is designated. Referring to FIG. 16, the height, horizontal width, and vertical width of the second observer 40 are roughly measured in advance, and the rectangular parallelepiped object 60 containing the second observer 40 is determined. The position and orientation of the rectangular parallelepiped object 60 are also determined on the basis of the coordinate system of the HMD 50. Further, the position and orientation of the image pickup apparatus 100 are roughly determined in the manner described in the first embodiment. After the initialization is performed, the process proceeds to step S1020.

In step S1020, an image captured by the image pickup apparatus 100 is loaded into the position and orientation measurement apparatus 2 via the image input unit 120. The image loaded in step S1020 is transmitted to the occluding region detector 230 and the image feature detector 140.

Then, in step S2090, the first rough position/orientation input unit 260 inputs a rough position and orientation of the image pickup apparatus 100. The second rough position/orientation input unit 270 inputs a rough position and orientation of the HMD 50 worn by the second observer 40. The rough position and orientation of the image pickup apparatus 100 are, for example, the position and orientation calculated in the preceding frame. The rough position and orientation of the HMD 50 are the up-to-date position and orientation calculated using the position and orientation measurement apparatus 2 that is operated by the observer 40.

Two position and orientation measurement apparatuses may run on the same computer, and may exchange calculated position and orientation results via inter-process communication. The two position and orientation measurement apparatuses may run on different computers, and may exchange calculated position and orientation results via a network. The HMD 50 may be provided with a magnetic, optical, or ultrasonic position and orientation measurement sensor with six degrees of freedom, and a rough position and orientation may be obtained from the output values of the sensor. Alternatively, the HMD 50 may be provided with a three-degree-of-freedom orientation sensor and position sensor, and a position and orientation may be obtained from a projected image of a marker on an image captured by an internal image pickup apparatus of the HMD 50 and measurement values of the three-degree-of-freedom sensors. That is, any method capable of providing rough position and orientation determination may be used. A rough position and orientation of the image pickup apparatus 100 may be obtained in a manner similar to that for the HMD 50.

Figure 17A:
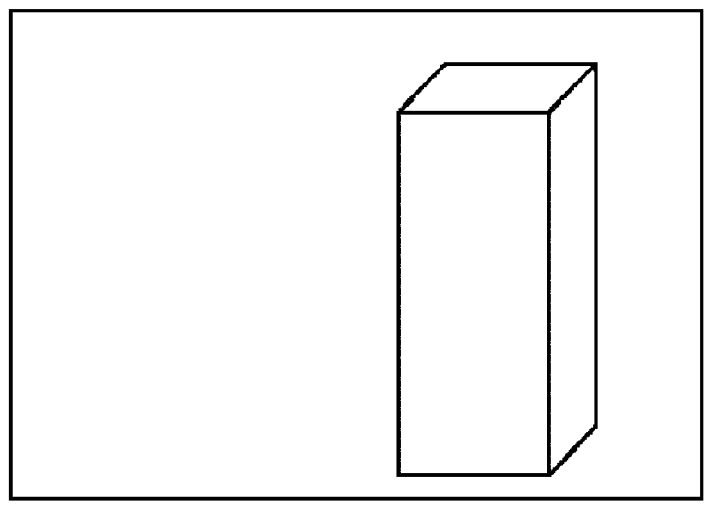
FIGS. 17A and 17B are diagrams showing detection of an occluding region according to the second embodiment.
Figure 17B:
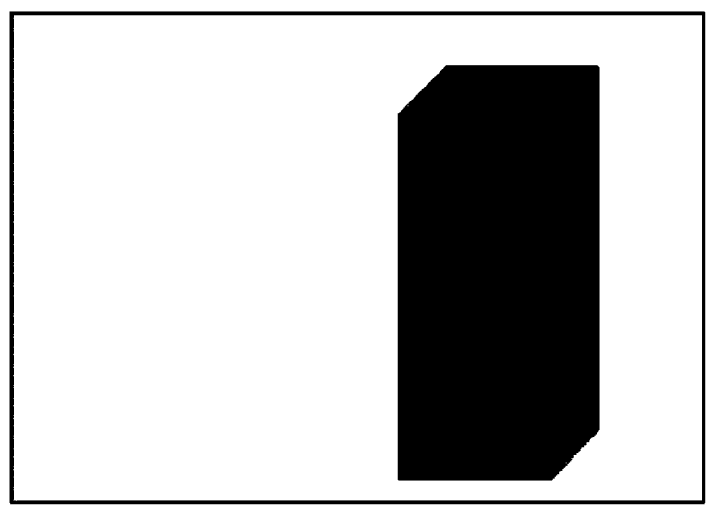

Then, in step S2030, an occluding region is detected. First, as shown in FIG. 17A, the rectangular parallelepiped object 60 is rendered on an image captured by the image pickup apparatus 100 on the basis of the rough positions and orientations of the image pickup apparatus 100 and the HMD 50 obtained in step S2090. Then, a portion where the rectangular parallelepiped object 60 is rendered on the image having the rectangular parallelepiped object 60 rendered thereon is output to the image feature detector 140 as an occluding region. FIG. 17B is a mask image represented in white and black, which is generated using the flags Fi. Image features are detected only in the white portion of the mask image.

The processing of steps S1040, S1050, S1060, S1070, and S1080 is similar to that in the first embodiment, and a description thereof is thus omitted.

Accordingly, in the second embodiment, an occluding region of a captured image is detected using a model of an occluding object and rough positions and orientations of the occluding object and an image pickup apparatus. No image features are detected in the occluding region. Therefore, stable high-accuracy calculation of the position and orientation of an observer relative to an observation target object can be achieved.

Modification Examples

In the first and second embodiments, no image features are detected in a region detected as an occluding region.

For example, in the case shown in FIG. 10, while a region having the same color as the color of a hand is detected as an occluding region, a boundary between a hand region and a non-hand region does not necessarily have the same color as the hand. Therefore, image features may be erroneously detected at the boundary between the hand region and the non-hand region.

Figure 18A:
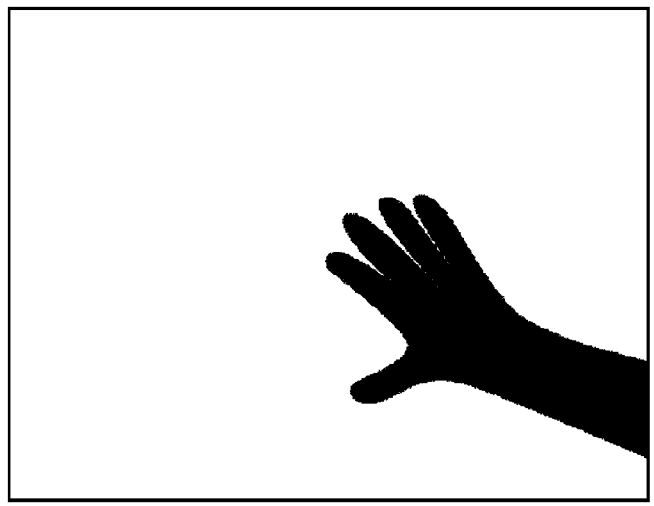
FIGS. 18A and 18B are diagrams showing a region neighboring the occluding region.
Figure 18B:
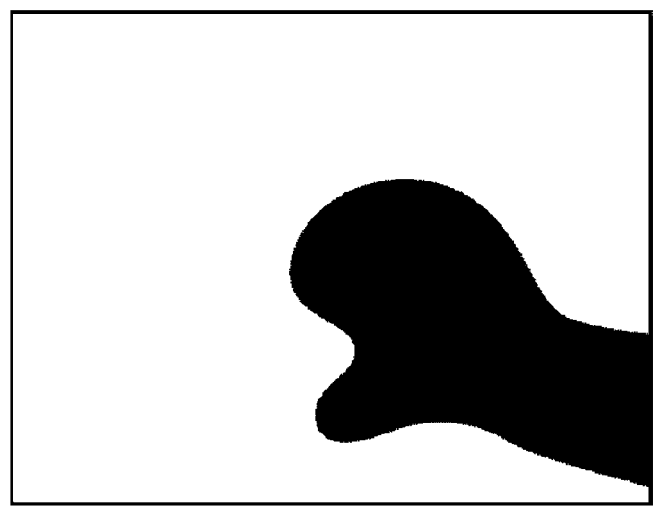

To prevent such erroneous detection, the detected occluding region and the boundary thereof may be included in an occluding region. For example, the occluding region is extended outward by one pixel so that the boundary thereof can be included in the occluding region. In addition to the boundary shown in FIG. 18A, a region neighboring the occluding region, as shown in FIG. 18B, may be included in the occluding region. In this case, the occluding region is extended by several pixels instead of one pixel. In the second embodiment, the size of the rectangular parallelepiped object 60 may be increased to achieve a similar advantage.

Other Embodiments

In the above-described embodiments, an occluding region is detected before the detection of image features, and image features are detected in a region other than the occluding region.

However, the image feature detector may be configured to detect image features without taking an occluding region into account, and the position/orientation calculating unit may be configured to determine whether or not the detected image features are included in an occluding region and to calculate the position and orientation of the image pickup apparatus only using the image features that are not included in the occluding region. In this case, it is only required that the detection of image features and the detection of an occluding region be performed prior to the position and orientation calculation. For example, the detection of image features and the detection of an occluding region may be performed in parallel on a computer.

In the above-described embodiments, edges are used as image features. However, the image features are not limited to edges, and may be point features. The point features are generally called feature points, interest points, or the like, and points such as points exhibiting an extreme intensity value on an image or corner points (vertices) are mainly detected. Point features can be detected using the Harris corner detector, which is disclosed in, for example, C. Harris and M. Stephens, "A Combined Corner and Edge Detector", Proc. $4^{th}$ Alvey Vision Conf., PP. 147-151, 1998 (hereinafter referred to as "Document 10"). In Document 8, point features are detected using a method called Scale Invariant Feature Transform (SIFT).

Point features are detected in a region other than an occluding region detected in the first and second embodiments to prevent erroneous detection in a manner similar to that in edge detection. Therefore, stable high-accuracy calculation of the position and orientation of the image pickup apparatus can be achieved.

While in the above-described embodiments, the position and orientation of an observer relative to an observation target object are determined, the position and orientation of the observation target object relative to the observer may be determined. Alternatively, either the position or orientation of the observer or observation target object may be determined using any other method capable of providing determination of either the position or orientation of the observer or observation target object. For example, the orientation of the observer or observation target object can be measured by a gyro sensor attached to the observation target object or the body of the observer.

The functions of the embodiments described above are also achieved by providing a computer (or a central processing unit (CPU) or a micro-processing unit (MPU)) of an apparatus or system connected to various devices with program code of software implementing the functions of the embodiments described above so as to operate the various devices to achieve the functions of the embodiments described above, and causing the computer of the system or apparatus to operate the various devices according to the program code.

In this case, the functions of the embodiments described above are achieved by the program code of the software, and both the program code and a storage medium storing the program code constitute embodiments of the present invention.

Examples of the storage medium storing the program code may include a floppy disk, a hard disk, an optical disk, a magneto-optical disk, a compact disk read-only memory (CD-ROM), a magnetic tape, a non-volatile memory card, and a ROM.

As well as achieving the functions of the embodiments described above by executing the program code read by the computer, the functions of the embodiments described above may be achieved through the use of the program code in combination with an operating system (OS), other software applications, or the like running on the computer. This also falls within the scope of the present invention.

Further, the provided program code may be stored in a memory of a function extension board placed in the computer or a function extension unit connected to the computer, and thereafter a CPU or the like of the function extension board or the function extension unit may execute part of or the entirety of actual processing according to the instruction of the program code to achieve the functions of the embodiments described above. This also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-219846 filed Aug. 11, 2006, which is hereby incorporated by reference herein in its entirety.

What is claimed is:

1. An image processing apparatus comprising:
an object defining unit configured to define specific information specifying a specific object that can occlude a target object to be observed, and to define a three-dimensional model of the target object;
an image obtaining unit configured to obtain a captured image of the target object captured by an image pickup apparatus;
an occluding region detector configured to detect an occluding region including the specific object from the obtained captured image by specifying the specific object using the defined specific information;
an occluding region extending unit configured to extend the occluding region outward by one or more pixels so as to form an extended occluding region;
an image feature detector configured to, after the occluding region extending unit has extended the occluding region, detect image edge features of the target object from a region of the captured image other than the extended occluding region, such that the image edge features of the target object detected by the image feature detector exclude image edge features of the specific object; and
a calculating unit configured to calculate a position and orientation of the target object in the captured image on the basis of correspondence between the image edge features detected by the image feature detector and features of the three-dimensional model of the target object.

2. The image processing apparatus according to claim 1, wherein the calculating unit is configured to calculate, on the basis of the extended occluding region, the position and/or orientation of the target object in the captured image on the basis of the image edge features detected in a region of the captured image other than the detected region.

3. The image processing apparatus according to claim 1, wherein the object defining unit is configured to define the specific object in terms of image feature information, and the occluding region detector is configured to detect the occluding region from the captured image on the basis of the defined image feature information.

4. The image processing apparatus according to claim 3, wherein the image feature information defining the specific object comprises a color or a pattern.

5. The image processing apparatus according to claim 4, wherein the specific object comprises human skin, and the color comprises the color of the skin.

6. The image processing apparatus according to claim 3, wherein the image feature information defining the specific object comprises features representing a human face region on an image.

7. The image processing apparatus according to claim 1, wherein the object defining unit is configured to define a three-dimensional shape of the specific object, the image processing apparatus further comprising:
 a first rough position and orientation obtaining unit configured to obtain a rough position and rough orientation of the image pickup apparatus; and
 a second rough position and orientation obtaining unit configured to obtain a rough position of the specific object or a rough position and rough orientation of the specific object, and
the region detector detects the region including the specific object from the captured image on the basis of the rough position and rough orientation of the image pickup apparatus obtained by the first rough position and orientation obtaining unit, the rough position of the specific object or the rough position and rough orientation of the specific object obtained by the second rough position and orientation obtaining unit, and the three-dimensional shape of the specific object.

8. The image processing apparatus according to claim 1, further comprising:
 a virtual-space image generator configured to generate a virtual-space image on the basis of a calculation result of the calculating unit; and
 an image synthesizing unit configured to synthesize the captured image and the virtual-space image,
 wherein an image in which the captured image and the virtual-space image are synthesized is presented to a user.

9. The image processing apparatus according to claim 8, wherein the virtual-space image is synthesized with the captured image without the extended occluding region detected by the occluding region detector.

10. The image processing apparatus according to claim 1, wherein the image edge features comprise line features or point features.

11. The image processing apparatus according to claim 1, wherein the image feature detector detects the image edge features of the target object from a region of the captured image other than the extended occluding region after extending the occluding region by the occluding region extending unit, without detecting the image edge features of the specific object from the extended occluding region.

12. The image processing apparatus according to claim 1, wherein the image feature detector comprises:
 a line setting unit configured to set a search line on the captured image; and
 a search unit configured to search edge features along the search line other than the extended occluding region.

13. The image processing apparatus according to claim 12, further comprising:
 a measurement unit configured to measure a position and orientation of the target object; and
 a projection unit configured to project a three-dimensional model of the target object to the captured image,
 wherein the line setting unit sets the search line on the captured image by drawing a search line from a line which projected three-dimensional model.

14. An image processing method comprising:
 a holding step of holding definition information defining specific information specifying a specific object that can occlude a target object to be observed, and defining a three-dimensional model of the target object;
 an image obtaining step of obtaining a captured image of the target object captured by an image pickup apparatus;
 an occluding region detecting step of detecting an occluding region including the specific object from the obtained captured image by specifying the specific object using the defined specific information;
 an occluding region extending step of extending the occluding region outward by one or more pixels so as to form an extended occluding region;
 an image feature detecting step of, after the occluding region extending step has extended the occluding region, detecting image edge features of the target object from a region of the captured image other than the extended occluding region, such that the image edge features of the target object detected in the image feature detecting step exclude image edge features of the specific object; and
 a calculating step of calculating a position and orientation of the target object in the captured image on the basis of correspondence between the image edge features detected in the image feature detecting step and features of the three-dimensional model of the target object.

15. A computer-readable storage storing thereon a computer program for causing a computer to execute the image processing method according to claim 14.

* * * * *